United States Patent
Mestery et al.

(10) Patent No.: US 11,848,865 B2
(45) Date of Patent: Dec. 19, 2023

(54) APPLICATION PROGRAMMING INTERFACE (API)-BASED MULTI-TENANT ROUTING CONTROL PLANE

(71) Applicant: Cisco Technology, Inc., San Jose, CA (US)

(72) Inventors: Kyle Andrew Donald Mestery, Woodbury, MN (US); Christopher Blair Murray, Surrey (CA); Jon Langemak, Rockford, MN (US); Rahim Lalani, Vancouver (CA); Alvin Wong, Delta (CA)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 17/486,477

(22) Filed: Sep. 27, 2021

(65) Prior Publication Data
US 2022/0385558 A1    Dec. 1, 2022

Related U.S. Application Data

(60) Provisional application No. 63/193,833, filed on May 27, 2021, provisional application No. 63/193,757, (Continued)

(51) Int. Cl.
*G06F 15/173* (2006.01)
*H04L 45/74* (2022.01)
(Continued)

(52) U.S. Cl.
CPC .......... *H04L 45/74* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 9,178,801 B1   11/2015   Guichard et al.
9,602,341 B1    3/2017   Degwekar et al.
(Continued)

FOREIGN PATENT DOCUMENTS

CN   111756632       10/2020
EP   2963866 A2      1/2016
(Continued)

OTHER PUBLICATIONS

Afolabi Ibrahim et al. : "Toward a Real Deployment of Network Services Orchestration and Configuration Convergence Framework for 5G Network Slices." IEEE Network, IEEE Service Center, New York, NY, US, vol. 35, No. 1, Dec. 14, 2020 (Dec. 14, 2020), pp. 242-250, XPOI.1837858, ISSN: 0890-8044, DOI: 10 . 1109/ MNET . 011.2000146 [retrieved on Feb. 16, 2021] the whole document.

(Continued)

*Primary Examiner* — Atta Khan
(74) *Attorney, Agent, or Firm* — Lee & Hayes, P.C.

(57) ABSTRACT

Techniques for using global virtual network instance (VNI) labels in a multi-domain network to route network data with a multi-tenant network overlay are described herein. A routing device provisioned in a network domain of the multi-domain network may register with a service discovery system of the network domain for use of network configuration data to establish routes through the multi-domain network with network nodes. Each network domain of the multi-domain network may include an application programming interface (API) server for processing API requests to make changes to configurations of a network domain. A border gateway protocol (BGP) large community may be utilized to encode global VNI labels, network addresses, (Continued)

local next hop nodes, and/or additional network information and sent to routing devices provisioned in separate network domains. A service chain may be signaled by global VNI labels to route network traffic through various services prior to reaching a destination endpoint.

20 Claims, 17 Drawing Sheets

Related U.S. Application Data filed on May 27, 2021, provisional application No. 63/193,771, filed on May 27, 2021, provisional application No. 63/193,801, filed on May 27, 2021, provisional application No. 63/193,813, filed on May 27, 2021.

(51) Int. Cl.
| | |
|---|---|
| H04L 12/46 | (2006.01) |
| H04L 45/02 | (2022.01) |
| H04L 45/50 | (2022.01) |
| H04L 45/741 | (2022.01) |
| H04L 67/51 | (2022.01) |
| H04L 41/0853 | (2022.01) |
| H04L 45/00 | (2022.01) |
| H04L 45/30 | (2022.01) |
| H04L 45/42 | (2022.01) |
| H04L 45/586 | (2022.01) |
| H04L 45/745 | (2022.01) |
| H04L 41/0816 | (2022.01) |

(52) U.S. Cl.
CPC ...... *H04L 41/0816* (2013.01); *H04L 41/0853* (2013.01); *H04L 45/02* (2013.01); *H04L 45/04* (2013.01); *H04L 45/22* (2013.01); *H04L 45/30* (2013.01); *H04L 45/42* (2013.01); *H04L 45/50* (2013.01); *H04L 45/586* (2013.01); *H04L 45/741* (2013.01); *H04L 45/745* (2013.01); *H04L 67/51* (2022.05)

(56) References Cited

U.S. PATENT DOCUMENTS

| | | | |
|---|---|---|---|
| 10,291,462 B1* | 5/2019 | Joyce | ............. H04L 41/145 |
| 10,382,401 B1 | 8/2019 | Lee et al. | |
| 10,887,276 B1 | 1/2021 | Parulkar et al. | |
| 11,159,366 B1 | 10/2021 | Gawade et al. | |
| 2013/0332577 A1 | 12/2013 | Nakil et al. | |
| 2015/0063351 A1 | 3/2015 | Moreno et al. | |
| 2015/0326473 A1 | 11/2015 | Dunbar et al. | |
| 2016/0124742 A1* | 5/2016 | Rangasamy | ............. H04L 41/00 717/103 |
| 2016/0277291 A1 | 9/2016 | Lakshmikanthan et al. | |
| 2017/0244631 A1 | 8/2017 | Guichard et al. | |
| 2017/0324654 A1 | 11/2017 | Previdi et al. | |
| 2018/0367363 A1 | 12/2018 | Jaeger | |
| 2018/0375963 A1 | 12/2018 | Hunt | |
| 2019/0037005 A1 | 1/2019 | Palladino et al. | |
| 2020/0059492 A1 | 2/2020 | Janakiraman et al. | |
| 2020/0236046 A1 | 7/2020 | Jain et al. | |
| 2020/0295997 A1 | 9/2020 | Kotalwar et al. | |
| 2021/0026703 A1 | 1/2021 | Fichtenholtz et al. | |
| 2022/0385572 A1 | 12/2022 | Murray | |
| 2023/0073976 A1* | 3/2023 | Ackerman | ............. G06Q 10/067 |

FOREIGN PATENT DOCUMENTS

| | | |
|---|---|---|
| EP | 2993821 A1 | 3/2016 |
| EP | 3254447 | 8/2017 |
| WO | WO2021055935 | 3/2021 |

OTHER PUBLICATIONS

Ankur Singla et al: Architecture Documentaion—OpenContrail Architecture Document, Jan. 24, 2015 (Jan. 24, 2015), pp. 1-35, XP055282550, Retrieved from the Internet: URL:https://web.archive.org/web/20150124113037/http://opencontrail..org/opencontrail.architecture-documentation/ [retrieved on Jun. 22, 2016) the whole document.

The PCT Search Report and Written Opinion dated Sep. 12, 2022 for PCT application No. PCT /US2022/030828, 16 pages.

The PCT Search Report and Written Opinion dated Sep. 9, 2022 for PCT application No. PCT/ US2022/030845, 14 pages.

Office Action for U.S. Appl. No. 17/486,647, dated Jan. 23, 2023, Christopher Blair Murray, "Using Global Virtual Network Instance (VNI) Labels to Signal a Service Chain", 12 pages.

Office Action for U.S. Appl. No. 17/486,647, dated May 9, 2023, Inventor #1 Christopher Blair Murray, "Using Global Virtual Network Instance (VNI) Labels to Signal a Service Chain," 14 pages.

* cited by examiner

700 ⟶

```
┌─────────────────────────────────────────────────────────────┐
│ RECEIVE, AT A FIRST ROUTER OF A FIRST NETWORK DOMAIN OF A  │
│ MULTI-DOMAIN NETWORK AND FROM A SECOND ROUTER OF A SECOND  │
│ NETWORK DOMAIN OF THE MULTI-DOMAIN NETWORK, A FIRST BORDER │
│ GATEWAY PROTOCOL (BGP) ADVERTISEMENT PACKET INCLUDING A    │
│ FIRST BGP LARGE COMMUNITY                                   │
│                            702                              │
└─────────────────────────────────────────────────────────────┘
                              │
                              ▼
┌─────────────────────────────────────────────────────────────┐
│ DECODE, FROM A FIRST PORTION OF THE FIRST BGP LARGE        │
│ COMMUNITY, A FIRST GLOBAL MULTIPROTOCOL LABEL SWITCHING    │
│ (MPLS) VIRTUAL PRIVATE NETWORK (VPN) LABEL CORRESPONDING   │
│ TO A FIRST TENANT NODE ASSOCIATED WITH THE SECOND ROUTER   │
│                            704                              │
└─────────────────────────────────────────────────────────────┘
                              │
                              ▼
┌─────────────────────────────────────────────────────────────┐
│ DECODE, FROM A SECOND PORTION OF THE FIRST BGP LARGE       │
│ COMMUNITY, A FIRST ADDRESS OF A FIRST TUNNEL ENDPOINT      │
│ ASSOCIATED WITH THE SECOND ROUTER                           │
│                            706                              │
└─────────────────────────────────────────────────────────────┘
                              │
                              ▼
┌─────────────────────────────────────────────────────────────┐
│ STORE, IN A DATABASE ASSOCIATED WITH THE FIRST ROUTER, A   │
│ MAPPING BETWEEN THE FIRST GLOBAL MPLS VPN LABEL AND THE    │
│ FIRST ADDRESS OF THE FIRST TUNNEL ENDPOINT                  │
│                            708                              │
└─────────────────────────────────────────────────────────────┘
```

```
┌─────────────────────────────────────────────────────────────────────┐
│ RECEIVE, AT A FIRST ROUTER OF A FIRST NETWORK DOMAIN ASSOCIATED WITH A │
│ MULTI-DOMAIN NETWORK AND FROM A SECOND ROUTER OF A SECOND NETWORK    │
│ DOMAIN ASSOCIATED WITH THE MULTI-DOMAIN NETWORK, A FIRST BORDER      │
│ GATEWAY PROTOCOL (BGP) ADVERTISEMENT PACKET INCLUDING ONE OR MORE    │
│ FIRST BGP LARGE COMMUNITIES ASSOCIATED WITH ONE OR MORE FIRST NEXT   │
│ HOP NODES ASSOCIATED WITH THE SECOND ROUTER                          │
│ 902                                                                  │
└─────────────────────────────────────────────────────────────────────┘
                                   ↓
┌─────────────────────────────────────────────────────────────────────┐
│ RECEIVE, AT THE FIRST ROUTER AND FROM A THIRD ROUTER OF THE SECOND   │
│ NETWORK DOMAIN, A SECOND BGP ADVERTISEMENT PACKET INCLUDING ONE OR   │
│ MORE SECOND BGP LARGE COMMUNITIES ASSOCIATED WITH ONE OR MORE        │
│ SECOND NEXT HOP NODES ASSOCIATED WITH THE THIRD ROUTER               │
│ 904                                                                  │
└─────────────────────────────────────────────────────────────────────┘
                                   ↓
┌─────────────────────────────────────────────────────────────────────┐
│ RECEIVE, AT THE FIRST ROUTER AND FROM A FIRST TENANT NODE OF THE FIRST │
│ NETWORK DOMAIN, A REQUEST TO SEND A DATA PACKET TO A SECOND TENANT   │
│ NODE OF THE SECOND NETWORK DOMAIN                                    │
│ 906                                                                  │
└─────────────────────────────────────────────────────────────────────┘
                                   ↓
┌─────────────────────────────────────────────────────────────────────┐
│ DETERMINE, BY THE FIRST ROUTER AND BASED AT LEAST IN PART ON THE FIRST │
│ BGP ADVERTISEMENT PACKET AND THE SECOND BGP ADVERTISEMENT PACKET,    │
│ A ROUTE FOR SENDING THE DATA PACKET FROM THE FIRST TENANT NODE TO THE │
│ SECOND TENANT NODE                                                   │
│ 908                                                                  │
└─────────────────────────────────────────────────────────────────────┘
                                   ↓
┌─────────────────────────────────────────────────────────────────────┐
│ SEND THE DATA PACKET FROM THE FIRST ROUTER AND TO ONE OF THE SECOND  │
│ ROUTER OR THE THIRD ROUTER BASED AT LEAST IN PART ON THE ROUTE       │
│ 910                                                                  │
└─────────────────────────────────────────────────────────────────────┘
```

FIG. 9

APPLICATION PROGRAMMING INTERFACE (API)-BASED MULTI-TENANT ROUTING CONTROL PLANE

CROSS REFERENCE TO RELATED APPLICATIONS

This application claims priority to U.S. Provisional Patent Application No. 63/193,801, filed May 27, 2021, U.S. Provisional Patent Application No. 63/193,833, filed May 27, 2021, U.S. Provisional Patent Application No. 63/193,813, filed May 27, 2021, U.S. Provisional Patent Application No. 63/193,771, filed May 27, 2021, and U.S. Provisional Patent Application No. 63/193,757, filed May 27, 2021, the entire contents of which are incorporated herein by reference.

TECHNICAL FIELD

The present disclosure relates generally to using global virtual network instance (VNI) labels in a multi-domain network to route network data with a multi-tenant network overlay.

BACKGROUND

Cloud-based service provider networks offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality.

Exterior gateway protocols may be employed to route communications between separate data centers and throughout a datacenter and to a desired tenant of a multi-tenant network. For instance, a border gateway protocol (BGP) may be utilized to exchange routing and reachability information between the datacenters. In various respects, BGP may be considered as the glue which holds the internet together. However, to make this protocol cloud-native in a way which can be utilized by multiple tenants, a service discovery must be performed. For example, BGP sessions are generally long-lived, and static, which is incompatible with operating in an ephemeral cloud environment.

Deploying and operating cloud services at scale in an autonomous way means rethinking about how the pieces fit together. As things scale, if you lack automation, organizations will have trouble operating the solution in a meaningful way. Take routing, as an example. In a multi-tenant environment, each tenant may want to run their own routing control plane. This would allow them to inject and remove routes for their own networks dynamically. However, having to run your own set of BGP daemons at each ingress/egress point is challenging. If the tenant is doing this or themselves, its a challenge they need to take on. If the operator runs these transparently for the tenant, the operator takes on this challenge. The problem with this approach is that managing all the individual pieces is a challenge. As the number of tenants grows, the number of BGP daemons grows in unison. The resources required become challenging as well. Moreover, maintaining full routing table state in BGP is not possible because BGP inherently only wants to know about the best path. That is, when advertising a path, the local information about which paths are available is typically lost. Some recent additions to BGP (specifically BGP add path) look to address this but does not always include the set of information required in a multi-tenant network overlay.

Additionally, providing multi-tenant network isolation is traditionally solved using well known architectures such as multiprotocol label switching (MPLS) and applications like MPLS virtual private networks (VPNs). One of the key requirements of these traditional solutions is that they require an end-to-end network built and designed for the specific application. That is, there's a tight coupling between the underlay network and tenant traffic that rides on top of it. For example, customer traffic may be isolated through the use of a tenant label that is stacked on top of the underlay transport labels. These labels are in most cases locally significant to a given router. Allocating a globally significant label per tenant would, lessen some of the burden and allow for different types of underlay transport networks. However, given that labels in current architectures are not globally significant this is not possible. Given that labels in current architectures are only locally significant to the next router, this means that it's more difficult than it should be to determine an originating router and/or tenant label.

Cloud-based Software-as-a-Service (SaaS) are also expanding and are supporting endpoints. As these cloud-based services expand, devices will begin to require specific cloud-based services as they are deployed, and as new technologies are developed, devices will need to support further cloud-based services. However, there is a need for techniques to signal a customer admin's intent for which services their traffic should pass through.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of an example method for a routing device to receive and decode a BGP advertisement including a BGP large community encoded with at least a global VNI label and/or an originating router IP address.

FIG. 9 illustrates a flow diagram of an example method for a first routing device in a first network domain to receive and decode a BGP advertisement including one or more encoded BGP large communities associated with each next hop local to a second routing device in a second network domain, and further determining a route to send a data packet from the first network domain to the second network domain.

DESCRIPTION OF EXAMPLE EMBODIMENTS

Overview

Figure 1:
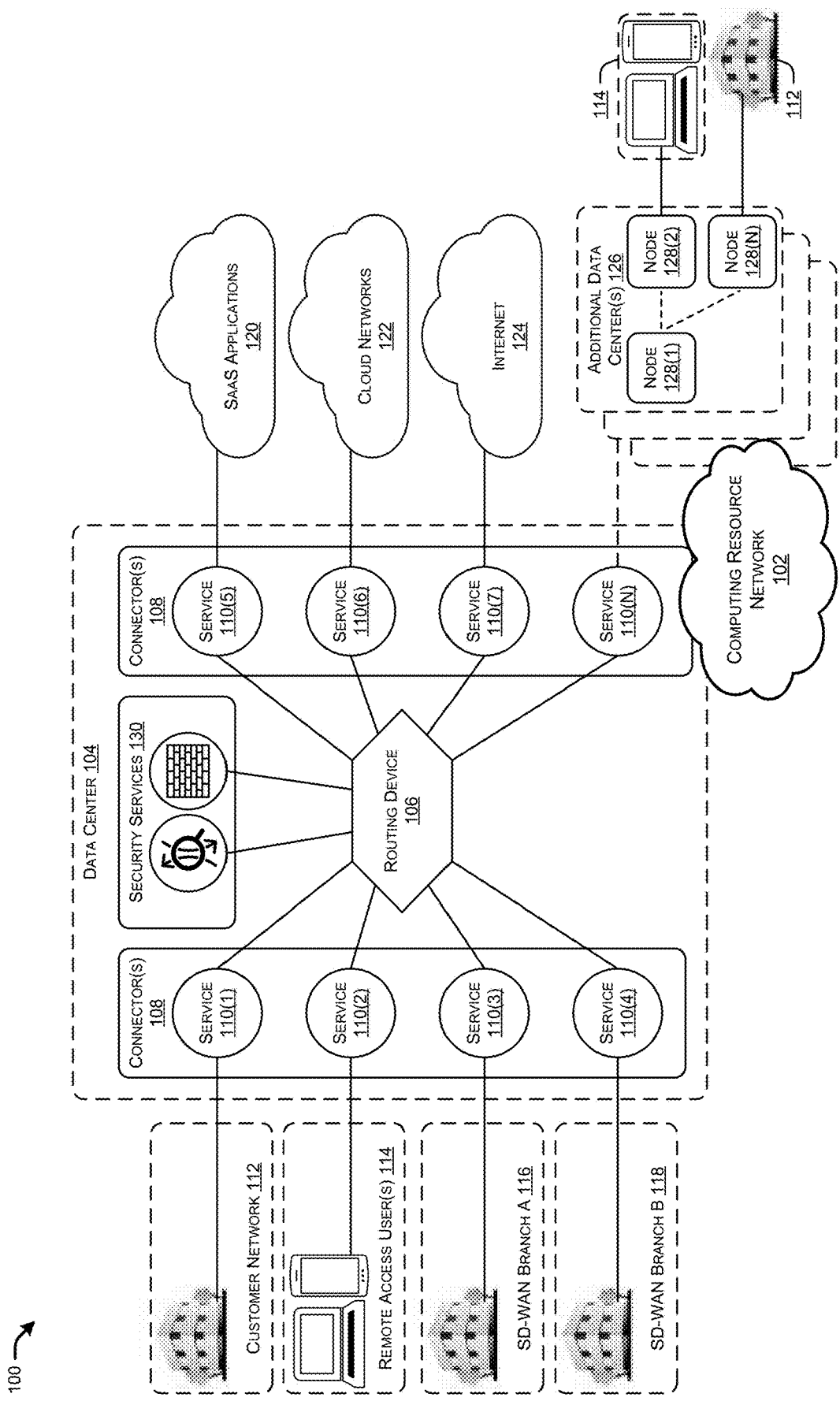
FIG. 1 illustrates an example environment for a multi-domain computing resource network including a routing device of a network domain to establish network connections between various types of networks using one or more connectors providing various services.

This disclosure describes method(s) for using global virtual network instance (VNI) labels (e.g., a multiprotocol label switching (MPLS) label, a virtual extensible local area network (VXLAN) label, a generic network virtualization encapsulation (GENEVE) label, etc.) in a multi-domain network to advertise network configurations, route network data, and/or signal a service chain using a multi-tenant network overlay. The method includes determining that a first tenant node is associated with a first router of a first network domain associated with a multi-domain network. Additionally, or alternatively, the method includes generating a first border gateway protocol (BGP) advertisement packet including a first BGP large community. Additionally, or alternatively, the method includes encoding, into a first portion of the first BGP large community, a first global virtual network instance (VNI) label associated with the first tenant node. Additionally, or alternatively, the method includes encoding, into a second portion of the first BGP large community, a first address of a first tunnel endpoint associated with the first router. Additionally, or alternatively, the method includes sending the first BGP advertisement packet to a second network domain associated with the multi-domain network.

Additionally, or alternatively, the method includes receiving, at a first router of a first network domain of a multi-domain network and from a second router of a second network domain of the multi-domain network, a first border gateway protocol (BGP) advertisement packet including a first BGP large community. Additionally, or alternatively, the method includes decoding, from a first portion of the first BGP large community, a first global virtual network instance (VNI) label corresponding to a first tenant node associated with the second router. Additionally, or alternatively, the method includes decoding, from a second portion of the first BGP large community, a first address of a first tunnel endpoint associated with the second router. Additionally, or alternatively, the method includes storing, in a database associated with the first router, a mapping between the first global VNI label and the first address of the first tunnel endpoint.

Additionally, or alternatively, the method includes identifying one or more next hop nodes associated with a first router of a first network domain associated with a multi-domain network. Additionally, or alternatively, the method includes generating, for individual ones of the one or more next hop nodes, a border gateway protocol (BGP) large community. Additionally, or alternatively, the method includes generating a BGP advertisement packet including, for the individual ones of the one or more next hop nodes, the BGP large community. Additionally, or alternatively, the method includes sending the BGP advertisement packet to a second network domain associated with the multi-domain network.

Additionally, or alternatively, the method includes receiving, at a first router of a first network domain associated with a multi-domain network and from a second router of a second network domain associated with the multi-domain network, a first border gateway protocol (BGP) advertisement packet including one or more first BGP large communities associated with one or more first next hop nodes associated with the second router. Additionally, or alternatively, the method includes receiving, at the first router and from a third router of the second network domain, a second BGP advertisement packet including one or more second BGP large communities associated with one or more second next hop nodes associated with the third router. Additionally, or alternatively, the method includes receiving, at the first router and from a first tenant node of the first network domain, a request to send a data packet to a second tenant node of the second network domain. Additionally, or alternatively, the method includes determining, by the first router and based at least in part on the first BGP advertisement packet and the second BGP advertisement packet, a route for sending the data packet from the first tenant node to the second tenant node. Additionally, or alternatively, the method includes sending the data packet from the first router and to one of the second router or the third router based at least in part on the route.

Additionally, or alternatively, the method includes receiving, at a router associated with a first network domain of a multi-domain network and from a traffic acquisition service, a request to send a data packet from a user endpoint and to a destination endpoint, the data packet including a primary global virtual network instance (VNI) label associated with the user endpoint. Additionally, or alternatively, the method includes identifying, in a datastore associated with the first network domain and based at least in part on a traffic type associated with the data packet, a packet flow configuration associated with the data packet, the packet flow configuration including one or more secondary global VNI labels. Additionally, or alternatively, the method includes sending, based at least in part on the packet flow configuration, the data packet from the router and to a first service node associated with the multi-domain network. Additionally, or alternatively, the method includes receiving the data packet at the router and from the first service node associated with the multi-domain network. Additionally, or alternatively, the method includes sending, based at least in part on the packet flow configuration, the data packet from the router and to a second service node associated with the multi-domain network. Additionally, or alternatively, the method includes receiving the data packet at the router and from the second service node associated with the multi-domain network. Additionally, or alternatively, the method includes sending the data packet from the router and to the destination endpoint.

Additionally, or alternatively, the method includes receiving, at a router associated with a first network domain of a multi-domain network and from a traffic acquisition service, a request to send a data packet from a user endpoint and to a destination endpoint, the data packet including a primary global virtual network instance (VNI) label associated with the user endpoint. Additionally, or alternatively, the method includes identifying, in a datastore associated with the first network domain and based at least in part on a traffic type associated with the data packet, a packet flow configuration associated with the data packet, the packet flow configuration including one or more secondary global VNI labels. Additionally, or alternatively, the method includes sending, based at least in part on the packet flow configuration, the data packet from the router and to a first service node associated with the multi-domain network. Additionally, or alternatively, the method includes receiving the data packet at the router and from the first service node associated with the multi-domain network. Additionally, or alternatively, the method includes sending the data packet from the router and to the destination endpoint.

Additionally, or alternatively, the method includes receiving an application programming interface (API) request associated with an API server of a first network domain of a multi-domain network. Additionally, or alternatively, the method includes determining that the API request corresponds to performance of an operation by a router associated with the first network domain, the router being configured to update network configurations for the first network domain. Additionally, or alternatively, the method includes identifying current network configurations for the first network domain in a datastore associated with the first network domain. Additionally, or alternatively, the method includes determining, based at least in part on the current network configurations and the operation, updated network configurations for the first network domain. Additionally, or alternatively, the method includes storing, in the datastore, the updated network configurations for the first network domain.

Additionally, or alternatively, the method includes receiving an API request associated with an API server of a first network domain of a multi-domain network. Additionally, or alternatively, the method includes determining that the API request corresponds to performance of an operation associated with the first network domain. Additionally, or alternatively, the method includes determining, based at least in part on current network configurations and the operation, updated network configurations for the first network domain. Additionally, or alternatively, the method includes storing, in a datastore associated with the first network domain, the updated network configurations for the first network domain.

Additionally, or alternatively, the method includes provisioning a routing device in a first network domain, wherein the first network domain includes a service discovery system that maintains network configuration data for a multi-domain network that includes at least the first network domain and a second network domain. Additionally, or alternatively, the method includes sending, from the routing device, a request to register with the service discovery system for use of the network configuration data. Additionally, or alternatively, the method includes identifying, by the routing device and based at least in part on the network configuration data, network nodes in the multi-domain network. Additionally, or alternatively, the method includes establishing, partly by the routing device, network routes through the multi-domain network with the network nodes.

Additionally, or alternatively, the method includes receiving, at a service discovery system of a first network domain that maintains network configuration data for a multi-domain network including the first network domain, an indication that a first routing device is being provisioned in the first network domain. Additionally, or alternatively, the method includes receiving, at the service discovery system and from the first routing device, a request to register with the service discovery system for use of the network configuration data. Additionally, or alternatively, the method includes identifying, by the service discovery system and in a datastore that stores the network configuration data, the network configuration data for the first network domain. Additionally, or alternatively, the method includes sending, from the service discovery system and to the first routing device, the network configuration data for the first network domain, wherein the network configuration data includes at least first configuration data for establishing first network routes through the multi-domain network with first network nodes in the first network domain.

Additionally, the techniques described herein may be performed by a system and/or device having non-transitory computer-readable media storing computer-executable instructions that, when executed by one or more processors, performs the method described above.

Example Embodiments

Exterior gateway protocols may be employed to route communications between separate data centers, separate cloud services, and throughout a datacenter and to a desired tenant of a multi-tenant network. For instance, a border gateway protocol (BGP) may be utilized to exchange routing and reachability information between the datacenters. However, to make this protocol cloud-native in a way which can be utilized by multiple tenants, a service discovery must be performed. For example, BGP sessions are generally long-lived, and static, which is incompatible with operating in an ephemeral cloud environment. Additionally, as deployment and operation of cloud services scale, if you lack automation, organizations may have trouble operating a solution in a meaningful manner. For example, in a multi-tenant environment, each tenant may want to execute their own routing control plane, allowing them to inject and remove routes from their own networks dynamically. However, having to run your own set of BGP daemons at each ingress and/or egress point is challenging, and if a tenant is doing this themselves, it is a challenge that they cannot work around. While BGP can locally maintain multiple paths for the same destination, that information is only every locally significant as BGP will only tell peers about the best path. For example, when advertising a path, the local information about available paths are typically lost. While recent additions to BGP (e.g., BGP add path) look to mitigate this issue, the set of information required in a multi-tenant network overlay is not always included.

In order to provide multi-tenant network isolation, traditional architectures may be utilized, such as, for example, multiprotocol label switching (MPLS) and applications like MPLS virtual private networks (VPNs). One of the key requirements of these traditional solutions is that they rely on an end-to-end network built and designed for the specific application, which requires a tight coupling between the underlay network and tenant traffic that rides on top of it. For example, customer traffic may be isolated through the use of a tenant label that is stacked on top of the underlay transport labels, and the labels in most cases are locally significant to a given router. Thus, allocating a globally significant label per tenant would lessen some of the burden and allow for different types of underlay transport networks. However, given that labels in current architectures are not globally significant this is not possible.

Cloud-based Software-as-a-Service (SaaS) are also expanding and are supporting endpoints. As these cloud-based services expand, devices will begin to require specific cloud-based services as they are deployed, and as new technologies are developed, devices will need to support further cloud-based services. However, there is a need for techniques to signal a customer administrator's intent for which services their traffic should pass through.

This disclosure describes techniques for a routing device (e.g., a router, a route reflector, and/or a router cluster), provisioned in a network domain of a multi-domain computing resource network, to register with a service discovery system of the network domain for use of network configuration data stored in a data store associated with the network domain and accessible by the routing device. In some examples, the routing device may be configured to utilize the network configuration data to identify network nodes in the multi-domain network and/or establish routes through the multi-domain network with the network nodes. Additionally, or alternatively, the network domain may include an application programming interface (API) server and the techniques may further include receiving and processing API requests received from an administrator of the network. In some examples, the API server may receive an API request and determine that the API request corresponds to the performance of an operation by a routing device configured to update network configurations for the network domain. The API server may then utilize current network configurations for the network domain and the operation to be performed by the routing device to determine updated network configurations for the network domain and store the updated network configurations in the datastore, where they may be pushed to and/or accessed by the routing device. Additionally, or alternatively, the techniques may further include generating global VNI labels (e.g., a multiprotocol label switching (MPLS) label, a virtual extensible local area network (VXLAN) label, a generic network virtualization encapsulation (GENEVE) label, etc.) associated with tenant nodes in the network domain and connected to the routing device, where the routing device may generate and send a BGP advertisement packet to one or more additional network domains of the multi-domain network. In some examples, the BGP advertisement packet may include one or more BGP large communities having at least a first encoded portion indicating a global VNI label of the tenant node and/or a second encoded portion indicating an address of a tunnel endpoint of the routing device. Additionally, or alternatively, the BGP advertisement packet may be configured to include additional BGP large communities for each next hop node associated with the routing device and local to the network domain. Additionally, or alternatively, the techniques may include utilizing one or more additional global VNI labels (secondary to the primary tenant VNI label previously described) to generate packet flow configurations specific to traffic types of a data packet and used to signal a service chain for the traffic type prior to routing the data packet to a destination endpoint.

Take, for example, a first network domain of a multi-domain network that includes at least the first network domain and a second network domain. In some examples, the first network domain may include a datastore and/or a service discovery system configured to maintain network configuration data for the multi-domain network. Additionally, or alternatively, the second network domain may include a routing device, a datastore, and/or a service discovery system configured to maintain network configuration data for the multi-domain network. In some examples, a datastore and a service discovery system may be configured as a single component or as separate components. Additionally, or alternatively, a routing device may be configured as a router and/or a route reflector. Additionally, or alternatively, individual network domains of the multi-domain network may include any number of routing devices (e.g., router(s) and/or route reflector(s)). Further, additional network domains may be included in the multi-domain network, and the individual network domains may include additional network components and not limited to the components described in this example. Additionally, or alternatively, individual network domains may include one or more separate tenants utilizing the associated computing resources of the individual network domain.

An admin may provision or configure a routing device in the first network domain. An indication of the provisioning of the routing device in the first network domain may be received at the service discovery system. Following the provisioning of the routing device, the routing device may come online and send a request to register with the service discovery system in the first network domain for use of the network configuration data, for example. The service discovery system may then identify the network configuration data for the first network domain where the routing device has been configured. In some examples, the service discovery system may identify the network configuration data in the datastore. Once the network configuration data has been identified, the service discovery system may send the network configuration data to the routing device. In some examples, the network configuration data may include configuration data indicating network nodes in the multi-domain network for establishing network routes through the multi-domain network. In some examples, the indications of the network nodes may be network nodes in the multi-domain network and/or network nodes specific to the first network domain. Once the routing device receives the network configuration data, the routing device may identify the network nodes and establish the network routes through the multi-domain network with the network nodes.

Once registered with the service discovery system, the routing device may be configured to periodically receive the network configuration data, such as, for example, whenever a change is made to the network configuration data of the multi-domain network. That is, the network configuration data may further provide, to the routing device provisioned in the first network domain (e.g., the first routing device), an indication of the routing device provisioned in the second network domain (e.g., the second routing device) that is registered with the service discovery system. The first routing device and/or the second routing device may then establish an overlay network tunnel connecting the first routing device and the second routing device. In some examples, the overlay network tunnel may be configured as a bareUDP tunnel or any other network tunnel having load balancing capability of different networks. The first routing device may then identify additional network nodes associated with the second routing device based on the network configuration data and may establish additional network routes through the multi-domain network with the additional network nodes. Additionally, or alternatively, the network configuration data may further provide, to the first routing device, an indication that the second routing device has gone offline, or otherwise deregistered with the service discovery system. In some examples, the first routing device may then remove the additional network routes through the multi-domain network and/or the network tunnel connecting the first routing device to the second routing device. That is, the first routing device may update a routing table of the first network domain in which it is provisioned following registration and/or deregistration of a second routing device in the second network domain.

The service discovery system may be further configured to provide indications of health and/or performance associated with the network nodes and/or the network routes of the multi-domain network to a routing device. For example, the first routing device may send a request for a health check of the first network domain to the service discovery system. The service discovery system may be configured to determine that one or more of the network routes are unreachable and/or performing below a threshold level of performance, and may send, to the first routing device, an indication that the one or more network routes is unreachable and/or performing below the threshold level of performance. In some examples, the first routing device may be configured to remove the one or more network routes and/or prioritize one or more separate network routes over the one or more network routes that are unreachable and/or performing below the threshold level of performance. Additionally, or alternatively, the first routing device may send a request for a performance check of the first network domain. The service discovery system may be configured to determine network performance data associated with the first network domain and may send the network performance data to the first routing device. In some examples, the network performance data may indicate various performance metrics associated with routing device(s), network nodes(s), and/or network route(s) associated with the first network domain, such as, for example, bandwidth usage of network node(s) and/or routing device(s), central processing unit (CPU) usage of network node(s) and/or routing device(s), and/or a number of links available to network node(s) and/or routing device(s). In some examples, the first routing device may be configured to make intelligent decisions using the network performance data, such as, for example, establishing additional network routes, separate from the original network routes, through the multi-domain network using the network nodes. For example, the additional network routes may be configured to reflect network performance data that is more favorable than the network performance data associated with the original network routes (e.g., the network performance data received from the service discovery system in response to the performance check).

As previously mentioned, the first network domain may include additional network components, such as, for example, an application programming interface (API) server. The API server may be configured to assist in automation with the multi-domain network. In some examples, a network admin may utilize the API server to connect remote branch device(s) to a network domain of the multi-domain network. For example, a network admin associated with the first network domain may send an API request to the API server to perform various operations and/or analyzed metrics associated with the first network domain. Additionally, or alternatively, the API server may receive an API request from a network node associated with the first network domain, such as, for example, a network connector node. The first routing device may be configured to update network configurations for the first network domain and the API request may correspond to performance of an operation by the first routing device of the first network domain. In some examples, the API server may be configured to receive the API request and determine that the API request corresponds to the performance of the operation by the first routing device. The API server may then identify current network configurations for the first network domain in the datastore associated with the first network domain. The API server may further be configured to determine updated network configurations for the first network domain using the current network configurations and the operation to be performed by the routing device, and may store the updated network configurations for the first network domain in the datastore. In some examples, the API server may be configured to determine the updated network configurations by identifying a change in the current network configurations for the first network domain caused at least partly by the performance of the operation. Once stored in the datastore, the updated network configurations may be pushed to and/or received by the first routing device.

In some examples, a routing device may be configured to utilize the updated network configurations in the datastore to perform various network operations associated with the API request. For example, the first routing device may be configured to generate and send a BGP advertisement message, indicating the updated network configurations for the first network domain, to an edge device in the second network domain (e.g., the second routing device). Additionally, or alternatively, as previously mentioned, the API request may be received at the API server from a network connector node, and the first routing device may be configured to send the updated network configurations for the first network domain to the network connector node and/or establish one or more network routes in association with the network connector node.

An API request may include one or more creating, reading, updating, and deleting (CRUD) operations to be performed by a routing device and/or another network component of the associated network domain. That is, the API request may correspond to a create, read, update, and/or delete operation to be performed in association with various network components of a network domain. Additionally, or alternatively, the routing device and/or other network component performing the operation may be configured to send, to a tenant of one or more tenants associated with the first network domain and from which the API request was received and/or to an admin associated with the tenant, a global identifier associated with the change that was made in association with the performance of the operation. For example, the API request may include a CRUD operation instructing the first routing device to create, read, update, and/or delete a virtual routing and forwarding (VRF) associated with the first network domain, and following performance of the CRUD operation, the routing device and/or the API server may be configured to send, to the tenant, and indication of a global identifier of a newly created, deleted, updated, or previously existing VRF associated with the first network domain. Additionally, or alternatively, the API request may include a CRUD operation instructing the first routing device to create, read, update, and/or delete a network connector node associated with the first network domain, and following performance of the CRUD operation, the routing device and/or the API server may be configured to send, to the tenant, and indication of a global identifier of a newly created, deleted, updated, or previously existing network connector node associated with the first network domain. Additionally, or alternatively, the API request may include a CRUD operation instructing the first routing device to create, read, update, and/or delete a network route for transmitting communications through one or more network connector nodes associated with the first network domain, and following performance of the CRUD operation, the routing device and/or the API server may be configured to send, to the tenant, and indication of a global identifier of a newly created, deleted, updated, or previously existing network route associated with the first network domain.

In some examples, an API request may include a request for network performance data associated with one or more network connector nodes and/or one or more network routes associated with the first network domain. The first routing device may be configured to collect telemetry data associated with the network to determine the performance data. In some examples, the network performance data may include an indication of network performance associated with network connector nodes, such as, for example, reachability of the network connector nodes, bandwidth usage of the network connector nodes, CPU usage of the network connector nodes, and/or a number of links available to the network connector nodes. Additionally, or alternatively, the network performance data may include an indication of the network route(s) associated with the first network domain and/or a preference associated with the network route(s). Additionally, or alternatively, the network performance data may include an indication of network performance associated with the change in the network configurations associated with the first network domain caused at least partly by the performance of the operation.

As previously mentioned, the routing device(s) of a network domain may be configured to generate global VNI labels associated with tenant nodes in the network domain and connected to the routing device. Such global VNI labels may provide the benefits offered by a specific VNI (e.g., an MPLS network) without utilizing the specific VNI (e.g., an actual MPLS network) to run an application. Instead, routing devices of separate network domains of the multi-domain network may utilize network tunnels (e.g., configured in the network overlay) to connect to one another directly and support VNI advantages on top of the tunnels without requiring the knowledge of the underlying network transport (e.g., configured in the network underlay) which the network tunnels run on top of In some examples, a routing device may generate and send a BGP advertisement packet to one or more of the additional network domains of the multi-domain network. The BGP advertisement packet may include one or more BGP large communities having one or more portions indicating various global VNI labels. In some examples, a BGP large community may include three separate 4-byte portions for encoding data.

Take, for example a first tenant node associated with a first routing device of a first network domain of the multi-domain network. The first routing device may be configured to determine that the first tenant node is connected to the first routing device (e.g., the first routing device may be responsible for routing communications to and from the first tenant node) and may generate a first BGP advertisement packet including a first BGP large community associated with the first tenant node. In some examples, the BGP advertisement packet may be configured to include a BGP large community for each of the individual tenant nodes associated with the first routing device. The first routing device may then encode a first global VNI label associated with the first tenant node (e.g., a universally unique identifier (UUID) of the first tenant node) into a first portion of the BGP large community. Additionally, or alternatively, the first routing device may encode a first address of a first network tunnel endpoint associated with the first routing device into a second portion of the BGP large community. In some examples, the first address may be an Internet Protocol version 4 (IPv4) address or include a mapping to an Internet Protocol version 6 (IPv6) tunnel address. Additionally, or alternatively, the first routing device may encode an indication of the virtual network instance (VNI) type if the virtual network being utilized into a third portion of the BGP large community. In examples where the first address of the first network tunnel endpoint associated with the first routing device is an IPv6 address, the encoded indication of the VNI type may indicate that the first address is an IPv6 address. Additionally, or alternatively, the encoded indication of the VNI type may include configuring one or more of the 4-bytes in the third portion (or in any of the other portions of the BGP large community) as an indicator (e.g., an integer or any other value that may be mapped in a database) that may be used to look up a corresponding IPv6 tunnel address. This may be achieved by performing a first lookup, based at least partly on the global VNI label associated with a tenant node indicating the UUID of the tenant node and/or the VNI type of the virtual network, and then performing a second lookup, based at least partly on the indicator encoded into the third portion, to determine the corresponding IPv6 address mapped to the indicator and associated with the tenant node Additionally, or alternatively, it may be assumed by the routing devices that the first address of the first network tunnel endpoint associated with the first routing device is an IPv4 address. Once one or more of the portions of the BGP large community have been encoded, the first routing device may send the first BGP advertisement packet to a second network domain (or any number of additional network domains) associated with the multi-domain network.

The routing devices may also be configured to decode any BGP large communities in BGP advertisement packets received from additional network domains and/or routing device(s). For example, the first routing device may receive a second BGP advertisement packet including a second BGP large community from a second routing device associated with a second network domain of the multi-domain network. That is, continuing from the example above, the first routing device may then decode the first portion of the second BGP large community including a second global VNI label corresponding to a second tenant node associated with the second routing device of the second network domain, the second portion of the second BGP large community including a second address of a second tunnel endpoint associated with the second routing device, and/or the third portion of the second BGP large community including an indication of a VNI type associated with the second network domain and/or an indication that the second address of the second tunnel endpoint is an IPv6 address. With the information from the second BGP large community decoded, the first routing device may then store, in the database associated with the first routing device, a mapping between the second global VNI label, the second address of the second tunnel endpoint, and/or the VNI type associated with the second network domain.

With the first routing device of the first network domain having the second address of the second tunnel endpoint of the second routing device of the second network domain and/or the second routing device of the second network domain having the first address of the first tunnel endpoint of the first routing device of the first network domain, a network tunnel may be established between the first routing device and the second routing device on top of the underlying network transport, where data may be routed to and/or from the first tunnel endpoint and to the second tunnel endpoint and/or to and/or from the second tunnel endpoint and to the first tunnel endpoint allowing for the first tenant and the second tenant to send and/or receive communication data from one another.

Additionally, or alternatively, a routing device of a network domain of the multi-domain network may be configured to populate a BGP advertisement packet with additional BGP large communities. In some examples, an additional BGP large community may be included in a BGP advertisement packet for each next hop node associated with the routing device and/or local to the network domain. The additional BGP large communities for each of the next hop nodes associated with the routing device may be encoded and/or decoded by the routing device using the techniques described above with respect to the tenant nodes. Additionally, or alternatively, a routing device associated with a network domain may be configured to encode and/or decode network egress information associated with the network domain (e.g., bandwidth availability, CPU availability, and/or priority associated with next hop nodes). By encoding the next local next hop nodes into additional BGP large communities, more advanced traffic balancing capabilities may be realized for the multi-domain network.

Take, for example, a first routing device in a first network domain of a multi-domain network having one or more first next hop nodes. The first routing device may be configured to identify the one or more first next hop nodes and generate, for each of the first next hop nodes, a BGP large community. The first routing device may also be configured to generate a BGP advertisement packet including each of the BGP large communities corresponding to the first next hop nodes. Once generated, the first routing device may send the BGP advertisement packet to a second network domain of the multi-domain network and/or a second routing device associated with the second network domain.

With the next hop nodes advertised to additional routing devices of separate network domains, a routing device may be configured to make intelligent routing decisions when routing traffic to and/or from a tenant. For example, the first routing device may be configured to receive a second BGP advertisement packet from a second routing device associated with a second network domain of the multi-domain network. The second BGP advertisement packet may include one or more second BGP large communities associated with one or more second next hop nodes associated with the second routing device. Additionally, or alternatively, the first routing device may be configured to receive a third BGP advertisement packet from a third routing device associated with the second network domain. The third BGP advertisement packet may include one or more third BGP large communities associated with one or more third next hop nodes associated with the third routing device. The first routing device may be configured to store, in a routing information base associated with the first routing device, respective mappings between the second routing device of the second network domain and the second next hop nodes and/or the third routing device of the second network domain and the third next hop nodes.

When the first routing device receives a request, from a first tenant node of the first network domain, to send a data packet to a second tenant node of the second network domain, the first routing device may be configured to make a determination as to sending to the data packet to the second routing device or the third routing device, based at least partly on the first next hop nodes, the second next hop nodes and/or the third next hop nodes. For example, the first routing device may be configured to determine a route for sending the data packet from the first tenant node and to the second tenant node. With the route determined, the first routing device may then send the data packet to the second routing device or the third routing device, based on various determinations described in greater detail below. While the below examples are provided, additional determinations may be used to determine the route to transmit the data packet from the first tenant node and to the second tenant node.

In some examples, the first routing device may determine that the number of the second next hop nodes is greater than the number of the third next hop nodes, and may configure the route to send the data packet over a network tunnel established between the first routing device and the second routing device.

Additionally, or alternatively, the first routing device may determine that the data packet is associated with a first traffic flow type. The first routing device may then determine that the second next hop nodes are associated with a second traffic flow type (e.g., unencrypted traffic flow) and/or that the third next hop nodes are associated with the first traffic flow type (e.g., encrypted traffic flow) that is different from the first traffic flow type, and may configured the route to send the data packet over a network tunnel established between the first routing device and the third routing device.

Additionally, or alternatively, the first routing device may determine, based on the second BGP large communities and/or the third BGP large communities, priorities associated with the second next hop nodes and/or the third next hop nodes, respectively. In such an example, the first routing device may determine that the second next hop nodes have a priority that is greater than the priority of the third next hop nodes, and may configured the route to send the data packet over the network tunnel established between the first routing device and the second routing device.

Additionally, or alternatively, the first routing device may be configured to determine a first available bandwidth and/or CPU usage associated with the second next hop nodes and/or a second available bandwidth and/or CPU usage associated with the third next hop nodes. The first routing device may then determine that the first available bandwidth and/or CPU usage is greater than the second available bandwidth and/or CPU usage, and may configured the route to send the data packet over the network tunnel established between the first routing device and the second routing device.

As previously described, a routing device of a network domain of the multi-domain network may be connected to one or more connector nodes of the network domain. In some examples, a connector node may be configured as a service, such as, for example, a cloud-delivered service, an inline security service, and/or a VPN service. In some examples, a service may comprise a deep packet inspection (DPI) service, a cloud-delivered firewall (CDFW) service, a network address translation (NAT) service, a secure web gateway (SWG) service, a domain name service (DNS) layer security service, and/or a cloud access security broker (CASB) service. Additionally, or alternatively, the service may comprise a VPN service allowing one or more tenant endpoints to connect to the network domain, transmit data to additional tenant endpoints, and/or utilize one or more services offered by a connector node.

While primary global VNI labels are described above with respect to identifying a tenant node (e.g., a universally unique identifier), a routing device may utilize secondary global VNI labels corresponding to respective connector nodes (potentially providing a service) to determine a packet flow configuration for a data packet. In some examples, a packet flow configuration may be configured as a service chain to route a data packet to one or more services, offered by respective connector nodes, before sending the data packet out to the internet and/or a destination endpoint. In some examples, a network administrator may configure various packet flow configurations for various traffic flow types. The routing device may then translate such a packet flow configuration into secondary global VNI labels, stacked in an order corresponding to the packet flow configuration, such that a data packet is routed to the connector node(s) corresponding to the secondary global VNI labels in the order specified by the packet flow configuration.

Take, for example, a first routing device associated with a first network domain of a multi-domain network. The first routing device may receive a request, from a connector node configured as a traffic acquisition service (e.g., a VPN allowing one or more tenant endpoints to connect to the network domain), to send a data packet from a tenant endpoint and to a destination endpoint. The data packet may include a primary global VNI label associated with the tenant endpoint (e.g., the universally unique identifier). The first routing device may then determine a traffic type associated with the data packet, such as, for example, DNS traffic, hypertext transfer protocol (HTTP) traffic, HTTP secure (HTTPS) traffic, and the like. The first routing device may then identify a packet flow configuration associated with the data packet based at least partly on the traffic type. As previously described, the packet flow configuration may include one or more secondary global VNI labels. The first routing device may then encapsulate the data packet with the secondary global VNI labels in the order specified by the packet flow configuration.

Once the data packet has been encapsulated with the secondary global VNI labels, the routing device may then send the data packet through a service chain as indicated by the secondary global VNI labels before sending the data packet to the destination endpoint. This may be achieved by the first routing device may consuming the outermost secondary global VNI label (e.g., the first of the secondary global VNI labels) to send the data packet from the first routing device and to a first service node (also referred to herein as a connector node) offering a first service. The first service node may then perform the first service on the data packet before returning the data packet to the first routing device. Once the first routing device has received the data packet back from the first service node, the first routing device may then consume the next outermost secondary global VNI label (e.g., the second of the secondary global VNI labels) to send the data packet from the first routing device and to a second service node offering a second service. Similar to the first service node described above, the second service node may then perform the second service on the data packet before returning the data packet to the first routing device. This process may be repeated any number of times corresponding to the number of secondary global VNI labels (e.g., 5 secondary global VNI labels would indicate sending the data packet to 5 service nodes associated with the secondary global VNI labels, respectively) before sending the data packet from the first routing device and to the destination endpoint.

In some examples, a service node indicated by a secondary global VNI label may not be provisioned in the first network domain, but rather provisioned in a second network domain of the multi-domain network that is reachable by the first routing device. In such an example, the first routing device may send the data packet to a second routing device of the second network domain via a network tunnel (described in more detail above), where the second routing device may send the data packet to the service node and receive the data packet back from the service node before returning the data packet to the first routing device.

As described herein, a computing-based and/or cloud-based solution and/or service and/or connector can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to using global VNI labels in a multi-domain network to route network data with a multi-tenant overlay. For instance, the techniques described herein may allow for the registration of a routing device at a service discovery system where network configuration data may be utilized to identify network nodes and configure network routes from the routing device through the multi-domain network and to additional routing devices registered with the service discovery system. By registering with the service discovery system, the multi-domain network may be easily scalable without a network admin having to configure network routes. Additionally, the techniques described herein may provide an API server in respective network domains of a multi-domain network. The API server provides a network admin with the ability to connect tenant endpoints to a network domain of a multi-domain network and/or perform various CRUD operations on various components associated with the network domain via API calls. Further, the techniques described herein may utilize BGP large communities encoded with tenant endpoint reachability information such as, for example, a universally unique identifier of a tenant, an address of a tunnel endpoint of a routing device associated with the tenant, VNI type information, and/or address(es) of next hop node(s) associated with the routing device. By encoding information into BGP large communities, traditional BGP communities may be extended and used to discover and connect edge devices of separate network domains. Additionally, by encoding the next local next hop nodes into additional BGP large communities, more advanced traffic balancing capabilities may be realized for the multi-domain network. In some examples, the advance traffic balancing capabilities may include capabilities similar to that of equal-cost multi-path (ECMP) techniques. Further, by stacking global VNI labels, a network admin may be able to signal a service chain for various types of network traffic to a routing device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 for a multi-domain computing resource network 102 including a data center 104 associated with a network domain utilizing a routing device 106 (or a fleet of routing device(s) 106) to establish network connections between various types of networks, devices, and/or applications using one or more connectors 108 providing various services 110(1)-(N), where N is any integer greater than 1. The various types of networks, devices, and/or applications the routing device 106 may connect to via the connector(s) may include, but are not limited to, a customer network 112, remote access users 114, software defined wide-area network(s) (SD-WANs), such as, SD-WAN branch A 116 and/or SD-WAN branch B 118, software as a service (SaaS) application(s) 120, cloud network(s) 122, the internet 124, and/or any number of additional data center(s) 126 having network node(s) 128 (1)-(N) (e.g., connector(s) 108 and/or routing device(s) 106. Additionally, or alternatively, the data center 104 may include one or more inline security services 130. In some examples, the inline security service(s) 130 may also be configured as a connector node 108.

The data center 104 and/or the additional data center(s) 126 may comprise various network components, such as, for example, network switch(es) (also referred to as node(s)) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, the routing device 106 and/or the connector node(s) 108.

Additionally, or alternatively, while not illustrated in FIG. 1, the network domain associated with the data center 104 may include a datastore and/or a service discovery system configured to maintain network configuration data for the multi-domain computing resource network 102. Additionally, or alternatively, additional network domains associated with the additional data center(s) 126 may include a routing device 106, a datastore, and/or a service discovery system configured to maintain network configuration data for the multi-domain computing resource network 102. In some examples, a datastore and a service discovery system may be configured as a single component or as separate components. Additionally, or alternatively, individual network domains of the multi-domain computing resource network 102 may include any number of routing devices 106 (e.g., router(s) and/or route reflector(s)). Additionally, or alternatively, individual network domains may include one or more separate tenants utilizing the associated computing resources of the individual network domain.

An admin may provision or configure a routing device 106 in the network domain associated with the data center 104. An indication of the provisioning of the routing device 106 in the network domain associated with the data center 104 may be received at the service discovery system. Following the provisioning of the routing device 106, the routing device 106 may come online and send a request to register with the service discovery system in the network domain associated with the data center 104 for use of the network configuration data, for example. The service discovery system may then identify the network configuration data for the network domain where the routing device 106 has been configured. In some examples, the service discovery system may identify the network configuration data in the datastore. Once the network configuration data has been identified, the service discovery system may send the network configuration data to the routing device 106. In some examples, the network configuration data may include configuration data indicating network nodes (e.g., connector nodes 108) in the multi-domain computing resource network 102 for establishing network routes through the multi-domain computing resource network 102. In some examples, the indications of the network nodes may be network nodes in the multi-domain computing resource network 102 and/or network nodes specific to the network domain associated with the data center 104. Once the routing device 106 receives the network configuration data, the routing device 106 may identify the network nodes and establish the network routes through the multi-domain computing resource network 102 with the network nodes.

Once registered with the service discovery system, the routing device 106 may be configured to periodically receive the network configuration data, such as, for example, whenever a change is made to the network configuration data of the multi-domain computing resource network 102. That is, the network configuration data may further provide, to the routing device 106 provisioned in the network domain associated with the data center 104 (e.g., the first routing device 106), an indication of a routing device 106 provisioned in an additional network domain associated with an additional data center 126 (e.g., the second routing device 106) that is registered with the service discovery system. In some examples, a node 128 associated with the additional data center 126 may be configured as the second routing device 106.

The first routing device 106 and/or the second routing device 106 may then establish an overlay network tunnel connecting the first routing device 106 and the second routing device 106. In some examples, the overlay network tunnel may be configured as a bareUDP tunnel or any other network tunnel having load balancing capability of different networks. The first routing device 106 may then identify additional network nodes 128 associated with the second routing device 106 based on the network configuration data and may establish additional network routes through the multi-domain computing resource network 102 with the additional network nodes 128.

Additionally, or alternatively, the network configuration data may further provide, to the first routing device 106, an indication that the second routing device 106 has gone offline, or otherwise deregistered with the service discovery system. In some examples, the first routing device 106 may then remove the additional network routes through the multi-domain computing resource network 102 and/or the network tunnel connecting the first routing device 106 to the second routing device 106. That is, the first routing device 106 may update a routing table of the network domain associated with the data center 104 in which it is provisioned following registration and/or deregistration of a second routing device 106 in the additional network domain associated with the additional data center 126.

The service discovery system may be further configured to provide indications of health and/or performance associated with the network nodes and/or the network routes of the multi-domain computing resource network 102 to a routing device 106. For example, the first routing device 106 may send a request for a health check of the network domain associated with the data center 104 to the service discovery system. The service discovery system may be configured to determine that one or more of the network routes are unreachable and/or performing below a threshold level of performance, and may send, to the routing device 106, an indication that the one or more network routes is unreachable and/or performing below the threshold level of performance. In some examples, the routing device 106 may be configured to remove the one or more network routes and/or prioritize one or more separate network routes over the one or more network routes that are unreachable and/or performing below the threshold level of performance.

Additionally, or alternatively, the routing device 106 may send a request for a performance check of the network domain associated with the data center 104. The service discovery system may be configured to determine network performance data associated with the network domain associated with the data center 104 and may send the network performance data to the routing device 106. In some examples, the network performance data may indicate various performance metrics associated with routing device(s) 106, network nodes(s) (e.g., connectors 108), and/or network route(s) associated with the network domain associated with the data center 104, such as, for example, bandwidth usage of network node(s) 108 and/or routing device(s) 106, central processing unit (CPU) usage of network node(s) 108 and/or routing device(s) 106, and/or a number of links available to network node(s) 108 and/or routing device(s) 106. In some examples, the routing device 106 may be configured to make intelligent decisions using the network performance data, such as, for example, establishing additional network routes, separate from the original network routes, through the multi-domain computing resource network 102 using the network nodes. For example, the additional network routes may be configured to reflect network performance data that is more favorable than the network performance data associated with the original network routes (e.g., the network performance data received from the service discovery system in response to the performance check).

As previously described, the routing device 106 may be configured as a fleet of routing device(s) 106 comprising any number of routing device(s) 106. In some examples, the routing device(s) 106 may be configured as a router and/or a route reflector. Additionally, or alternatively, the routing device 106 may be configured to utilize the connector(s) 108 as a bridge between the various service(s) 110. In some examples, the service(s) 110 may be configured as, for example, a cloud-delivered service, an inline security service 130, and/or a VPN service. In some examples, a service 110 may comprise a deep packet inspection (DPI) service, a cloud-delivered firewall (CDFW) service, a network address translation (NAT) service, a secure web gateway (SWG) service, a domain name service (DNS) layer security service, and/or a cloud access security broker (CASB) service. Additionally, or alternatively, the service 110 may comprise a VPN service allowing one or more tenant endpoints to connect to the network domain, transmit data to additional tenant endpoints, and/or utilize one or more services offered by a connector node.

As illustrated in FIG. 1, the connectors 108 (also referred to herein as network nodes) in the left portion of the data center 104 may include service(s) 110(1)-(4) configured as VPN services allowing tenant endpoints, such as, for example, the customer network 112, the remote access user(s) 114, SD-WAN branch A 116, and/or SD-WAN branch B 118 to connect to the multi-domain computing resource network 102. Additionally, or alternatively, the connectors 108 in the right portion of the data center 104 may include service(s) 110(5)-(N) configured as cloud-delivered service(s) allowing the data center 104 (also referred to herein as a network domain) to connect to the SaaS applications 120, cloud networks 122, the internet 124, and/or additional data center(s) 126. In some examples, the routing device 106 may be configured to connect to one or more node(s) 128, configured as additional routing device(s) 106, of the additional data center(s) 126 via an overlay network tunnel.

Take, for example, one or more tenant endpoints associated with the customer network 112. The customer network 112 may connect to the multi-domain computing resource network 102 via a connector node 108 providing a service 110(1) configured as a VPN service. The routing device 106 may handle all of the network routing to and from the customer network 112 via the VPN service 110(1) executing on the connector node 108. In some examples, the tenant node of the customer network 112 (illustrated on the left side of FIG. 1) may wish to send a data packet to a destination endpoint associated with an additional customer network 112 and/or remote access user 114 connected to one or more additional data center(s) 126 of the multi-domain computing resource network 102 via one or more network node(s) 128 of the additional data center 126, which may be configured as a connector node 108 providing a service 110 also configured as a VPN service. The routing device 106 may receive the data packet from the VPN service 110(1) and route the data packet to an additional routing device 106 (e.g., a node 128 of the additional data center 126 configured as a routing device 106) via a network tunnel connected by a first tunnel endpoint associated with the routing device 106 of the data center 104 and a second tunnel endpoint associated with the routing device 106 of the additional data center 126. In some examples, the service 110(N) may be configured as a first tunnel endpoint. The additional routing device 106 may then transmit the data packet to the destination endpoint of the additional customer network 112.

Additionally, or alternatively, the traffic flow type of the data packet may require the data packet to be transmitted through one or more security services prior to sending the data packet to the destination endpoint. In some examples, the routing device 106 may send the data packet to one or more of the security services 130, where the security service 130 may perform various security services, as described above, before returning the data packet back to the routing device 106. As described in more detail below with respect to FIG. 4, the routing device may determine a packet flow configuration defining a service chain of security service(s) 130 that the data packet is to be routed to prior to sending the data packet o the destination endpoint.

Additionally, or alternatively, a tenant endpoint associated with a customer network 112, remote access user(s) 114, SD-WAN branch A 116, and/or SD-WAN branch B 118 may request to utilize a SaaS application 120, access a cloud network 122, and/or the internet 124. In some examples, the routing device 106 may receive the request via a connector node 108 hosting a service 110(1)-(4) configured as a VPN service. The routing device may then establish a connection from the tenant endpoint associated with the customer network 112, the remote access user(s) 114, the SD-WAN branch A 116, and/or the SD-WAN branch B 118, via the one or more connector nodes 108 hosting the VPN service 110(1)-(4) and to one or more connector node(s) 108 hosting a service 110(5)-(7) configured to provide access to a SaaS application 120, a cloud network 122, and/or the internet 124.

Figure 2:
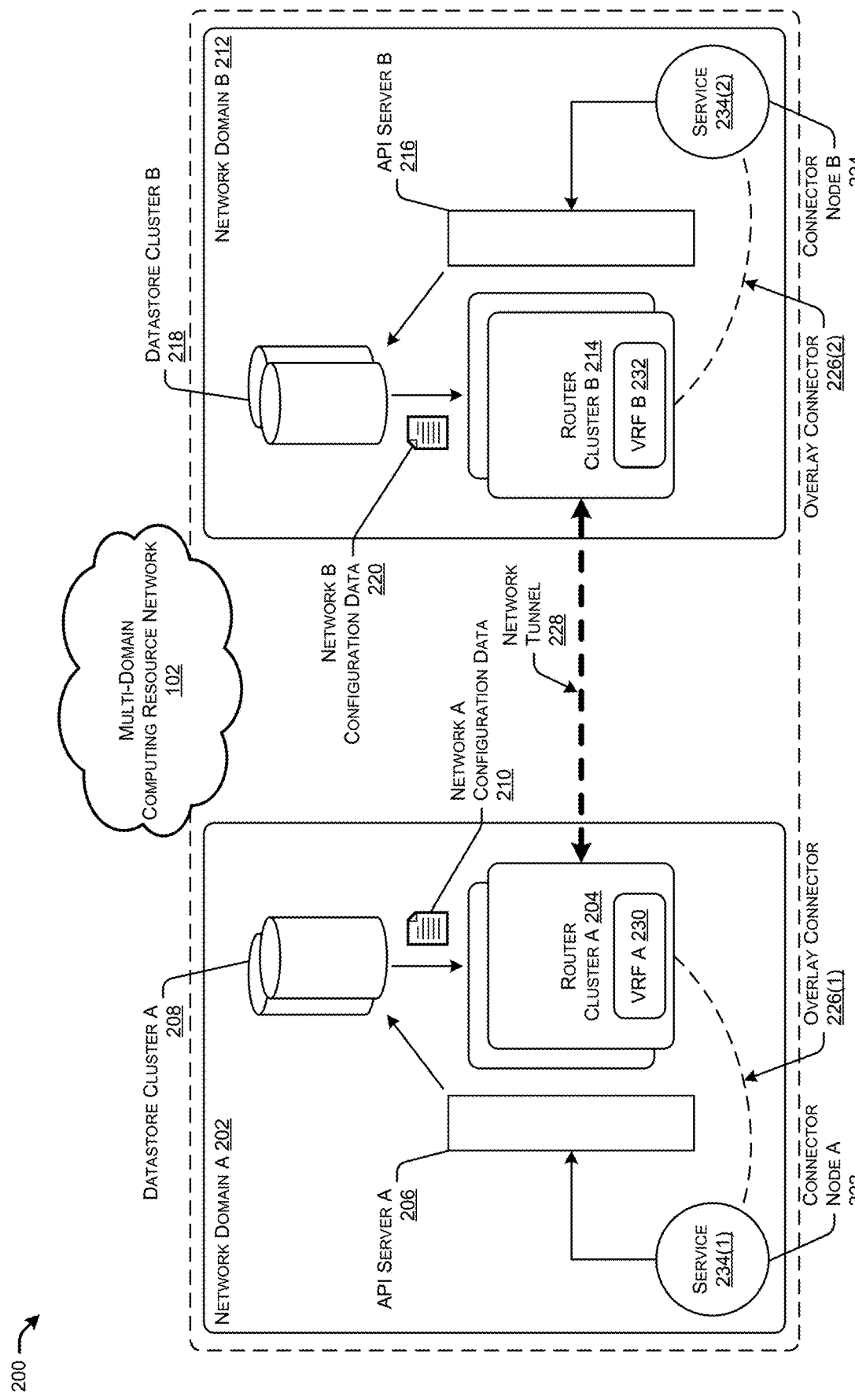
FIG. 2 illustrates an example environment for establishing a multi-domain network that connects a first network domain, having a first router cluster, a first application programming interface (API) server, and a first key/value datastore, to a second network domain, having a second router cluster, a second API server, and a second key/value datastore.

FIG. 2 illustrates an example environment 200 for establishing a multi-domain computing resource network 102 that connects a first network domain (e.g., network domain A 202), having a first router cluster (e.g., router cluster A 204), a first application programming interface (API) server (e.g., API server A 206), and a first key/value datastore (e.g., datastore cluster A 208) storing first network configuration data (e.g., network A configuration 210), to a second network domain (e.g., network domain B 212), having a second router cluster (e.g., router cluster B 214), a second API server (e.g., API server B 216, and a second key/value datastore (e.g., datastore cluster B 218) storing second network configuration data (e.g., network B configuration 220).

In some examples, the network domain A 202 may include a service discovery system configured to maintain the network A configuration data 210 for the multi-domain computing resource network 102. In some examples, datastore cluster A 208 may be configured as the service discovery system. Additionally, or alternatively, the datastore cluster A 208 and the service discovery system may be configured as separate components. Additionally, or alternatively, network domain B 212 may include a service discovery system configured to maintain network B configuration data for the multi-domain computing resource network 102. In some examples, datastore cluster B 218 may be configured as the service discovery system. Additionally, or alternatively, the datastore cluster A 218 and the service discovery system may be configured as separate components. Additionally, or alternatively, individual network domains 202, 212 of the multi-domain computing resource network 102 may include any number of routing devices (e.g., router(s) and/or route reflector(s)) included in respective router cluster(s) 204, 214. Additionally, or alternatively, the individual network domains 202, 212 may include one or more separate tenants utilizing the associated computing resources of the individual network domain 202, 212.

An admin may provision or configure a router of router cluster A 204 in the network domain A 202. An indication of the provisioning associated with the router cluster A 204 in the network domain A 202 may be received at the service discovery system. Following the provisioning of the router cluster A 204, the router cluster A 204 may come online and send a request to register with the service discovery system in the network domain A 202 for use of the network A configuration data 210, for example. The service discovery system may then identify the network A configuration data 210 for the network domain A 202 where the router cluster A 204 has been configured. In some examples, the service discovery system may identify the network A configuration data 210 in the datastore cluster A 208. Once the network A configuration data 210 has been identified, the service discovery system may send the network A configuration data 210 to the router cluster A 204.

In some examples, the network A configuration data 210 may include configuration data indicating connector nodes (e.g., connector node A 222 and/or connector node B 224) in the multi-domain computing resource network 102 for establishing network routes through the multi-domain computing resource network 102. In some examples, the indications of the connector nodes may be connector nodes in the multi-domain computing resource network 102 (e.g., connector node A 222 and/or connector node B 224) and/or connector nodes specific to the network domain A 202 (e.g., connector node A 222). Once the router cluster A 204 receives the network A configuration data 210, the router cluster A 204 may identify connector node A 222 and establish a network overlay connector 226(1) between the router cluster A 204 and the connector node A 222 for establishing routes through the multi-domain computing resource network 102 with the connector node A 222. Additionally, or alternatively, the router cluster B 214 may receive network B configuration data 220 and may identify connector node B 224 and establish a network overlay connector 226(2) between the router cluster B 214 and the connector node B 224 for establishing routes through the multi-domain computing resource network 102.

Once registered with the service discovery system, the router cluster A 204 may be configured to periodically receive the network A configuration data 210, such as, for example, whenever a change is made to the network A configuration data 210 and/or the network B configuration data 220 of the multi-domain computing resource network 102. That is, the network A configuration data 210 may further provide, to the router cluster A 204, an indication of a router cluster B 214 provisioned in network domain B 212 that is registered with the service discovery system.

The router cluster A 204 and/or the router cluster B 214 may then establish an overlay network tunnel 228 connecting the router cluster A 204 and the router cluster B 214. In some examples, the network tunnel 228 may be configured as a bareUDP tunnel or any other network tunnel having load balancing capability of different networks. The router cluster A 204 may then identify additional network nodes, such as connector node B 224 associated with the router cluster B 214 based on the network A configuration data 210 and may establish additional network routes through the multi-domain computing resource network 102 with the connector node B 224.

Additionally, or alternatively, the network configuration data may further provide, to the router cluster A 204, an indication that the router cluster B 214 has gone offline, or otherwise deregistered with the service discovery system. In some examples, the router cluster A 204 may then remove the additional network routes through the multi-domain computing resource network 102 and/or the network tunnel 228 connecting the router cluster A 204 to the router cluster B 214. That is, the router cluster A 204 may update a routing table, such as, for example, VRF A 230 of the network domain A 202 in which it is provisioned following registration and/or deregistration of the router cluster B 214 in the network domain B 212. Additionally, or alternatively, in examples where a single router of router cluster B 214 has registered and/or deregistered with the service discovery system, the remaining routers in router cluster B 212 may update a routing table, such as, VRF B 232 of the network domain B 212.

An API server 206, 216 may be configured to assist in automation with the multi-domain computing resource network 102. In some examples, a network admin may utilize an API server 206, 216 to connect remote branch device(s) to a network domain 202, 212 of the multi-domain computing resource network 102. For example, a network admin associated with the network domain A 202 may send an API request to API server A 206 to perform various operations and/or analyzed metrics associated with the network domain A 202. Additionally, or alternatively, API server A 206 may receive an API request from a connector node associated with the network domain A 202, such as, for example, connector node A 222. In some examples, a connector node may be executing a service 234, such as, for example, the one or more service(s) 110 as described with respect to FIG. 1. The router cluster A 204 may be configured to update network A configuration data 210 for the network domain A 202 and the API request may correspond to performance of an operation by the router cluster A 204 of the network domain A 202. In some examples, the API server A 206 may be configured to receive the API request and determine that the API request corresponds to the performance of the operation by a routing device associated with router cluster A 204. The API server A 206 may then identify current network A configuration data 210 for the network domain A 202 in the datastore cluster A 208. The API server A 206 may further be configured to determine updated network A configuration data 210 for the network domain A 202 using the current network A configuration data 210 and the operation to be performed by router cluster A 204, and may store the updated network A configuration data 210 for the network domain A 202 in the datastore cluster A 208. In some examples, API server A 206 may be configured to determine the updated network A configuration data 210 by identifying a change in the current network A configuration data 210 for the network domain A 202 caused at least partly by the performance of the operation. Once stored in the datastore cluster A 208, the updated network A configuration data 210 may be pushed to and/or received by router cluster A 204.

In some examples, a router cluster 204, 214 may be configured to utilize updated network configuration data 210, 220 in a datastore cluster 208, 218 to perform various network operations associated with the API request. For example, router cluster A 204 may be configured to generate and send a BGP advertisement message, indicating the updated network A configuration data 210 for the network domain A 202, to an edge device in the network domain B (e.g., a routing device included in router cluster B 214). Additionally, or alternatively, as previously mentioned, the API request may be received at API server A 204 from network connector node A 222, and the router cluster A 204 may be configured to send the updated network A configuration data 210 for the network domain A 202 to network connector node A 222 and/or a network overlay connector 226(1) in association with network connector node A 222.

An API request may include one or more creating, reading, updating, and deleting (CRUD) operations to be performed by a routing device associated with a router cluster 204, 214 and/or another network component of the associated network domain 202, 212. That is, the API request may correspond to a create, read, update, and/or delete operation to be performed in association with various network components of a network domain 202 212. Additionally, or alternatively, the router cluster 204, 214 and/or other network component performing the operation may be configured to send, to a tenant of one or more tenants associated with the network domain A 202 and from which the API request was received and/or to an admin associated with the tenant, a global identifier associated with the change that was made in association with the performance of the operation.

For example, the API request may include a CRUD operation instructing router cluster A 204 to create, read, update, and/or delete a virtual routing and forwarding (VRF) (e.g., VRF A 230) associated with network domain A 202, and following performance of the CRUD operation, the router cluster A 204 and/or the API server A 206 may be configured to send, to the tenant, and indication of a global identifier of a newly created, deleted, updated, or previously existing VRF A 230 associated with network domain A 202. Additionally, or alternatively, the API request may include a CRUD operation instructing router cluster A 204 to create, read, update, and/or delete network connector node A 222 associated with network domain A 202, and following performance of the CRUD operation, the router cluster A 204 and/or the API server A 206 may be configured to send, to the tenant, and indication of a global identifier of a newly created, deleted, updated, or previously existing connector node A 222 associated with network domain A 202. Additionally, or alternatively, the API request may include a CRUD operation instructing the first routing device to create, read, update, and/or delete a network route for transmitting communications through connector node A 222 via the overlay connector 226(1), and following performance of the CRUD operation, router cluster A 204 and/or the API server A 206 may be configured to send, to the tenant, and indication of a global identifier of a newly created, deleted, updated, or previously existing network route associated with network domain A 202.

In some examples, an API request may include a request for network performance data associated with one or more connector nodes 222, 224 and/or one or more network routes associated with network domain A 202. Router cluster A 204 may be configured to collect telemetry data associated with network domain A 202 to determine the performance data. In some examples, the network performance data may include an indication of network performance associated with connector node A 222, such as, for example, reachability of connector node A 222, bandwidth usage of connector node A 222, CPU usage of connector node A 222, and/or a number of links available to connector node A 222. Additionally, or alternatively, the network performance data may include an indication of the network route(s) associated with the network domain A 202 and/or a preference associated with the network route(s). Additionally, or alternatively, the network performance data may include an indication of network performance associated with the change in the network A configuration data 210 associated with network domain A 202 caused at least partly by the performance of the operation.

Figure 3:
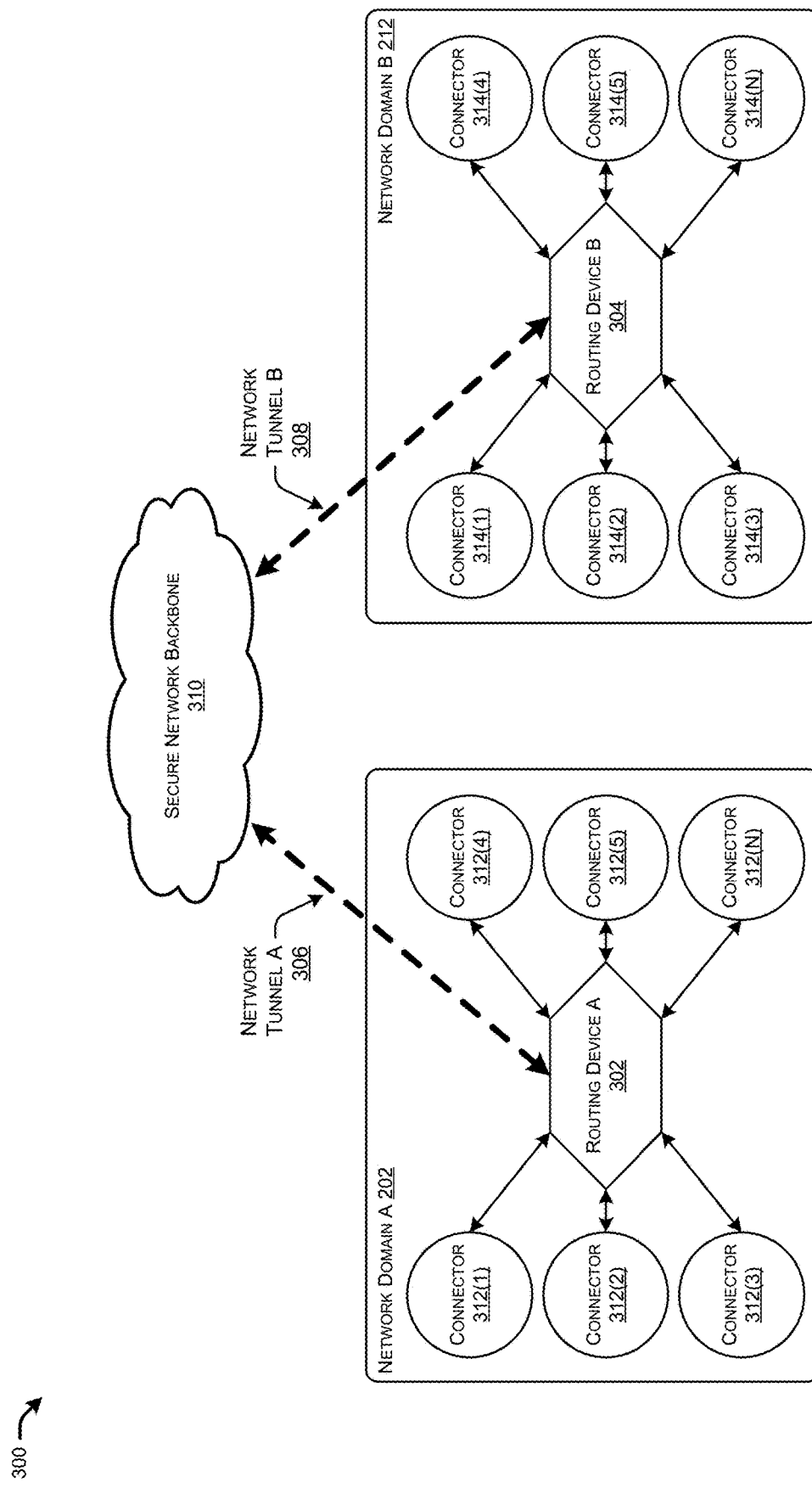
FIG. 3 illustrates an example environment for connecting a first network domain to a second network domain via respective router(s) connected via a network tunnel to route traffic through one or more first connectors of the first network domain and/or through one or more second connectors of the second network domain with virtual network instance (VNI) tags.

FIG. 3 illustrates an example environment for connecting a first network domain (e.g., network domain A 202) to a second network domain (e.g., network domain B 212) via respective routing device(s) (e.g., routing device A 302 and/or routing device B 304) connected via one or more network tunnel(s) (e.g., network tunnel A 306 and/or network tunnel B 308) connecting the routing device(s) 302, 304 to a secure network backbone 310 to route traffic through one or more first connectors 312(1)-(N) of the network domain A 202 and/or through one or more second connectors 314(1)-(N) of the network domain B 212 with VNI tags (e.g., MPLS, VXLAN, GENEVE, etc.). In some examples, routing device A 302 may be configured as a single routing device of the router cluster A 204 and routing device B 304 may be configured as a single routing device of the router cluster B 214, as described with respect to FIG. 2.

The routing device(s) 302, 304 of a network domain 202, 212 may be configured to generate global VNI labels associated with tenant nodes in the network domain 202, 212 and connected to the routing device 302, 304 via one or more connector(s) 312, 314. Such global VNI labels may provide the benefits offered by a specific VNI (e.g., an MPLS network) without utilizing the specific VNI (e.g., an actual MPLS network) to run an application. Instead, routing devices 302, 304 of separate network domains 202, 212 of the multi-domain computing resource network 102 may utilize network tunnels 306, 308 (e.g., configured in the network overlay) to connect to one another directly and support VNIs on top of the network tunnels 306, 308 without requiring the knowledge of the underlying network transport (e.g., configured in the network underlay) which the network tunnels 306, 308 run on top of. In some examples, routing device A 302 may generate and send a BGP advertisement packet to network domain B 212 of the multi-domain computing resource network 102. The BGP advertisement packet may include one or more BGP large communities having one or more portions indicating various global VNI labels. In some examples, a BGP large community may include three separate 4-byte portions for encoding data to establish the network tunnels 306, 308 and transmit data between network domain A 202 and network domain B 212. In some examples, the data may include an address of a tunnel endpoint associated with network tunnel A 306 and/or network tunnel B 308. The BGP large communities are described in more detail with respect to FIG. 5. In some examples, the global VNI labels may be configured to create a network flow configuration indicating a chain of service(s) hosted by connector node(s) 312, 314 that a data packet is required to pass through before being routed to a destination endpoint. Examples of a service chain are described in more detail with respect to FIG. 4.

Once routing device A 302 of the network domain A 202 knows the address of the tunnel endpoint of network tunnel B 308 connected to the routing device B 304 of network domain B 212 and/or routing device B 304 of network domain B 212 knows the address of the tunnel endpoint of network tunnel A 306 connected to routing device A 302 of network domain A 202, a connection may be established between network tunnel A 306 and network tunnel B 308 via the secure network backbone 310 of the multi-domain computing resource network 102 on top of the underlying network transport, where data may be routed to and/or from the tunnel endpoint of network tunnel A 306 and to the tunnel endpoint of network tunnel B 308 and/or to and/or from the tunnel endpoint of network tunnel B 308 and to the tunnel endpoint of network tunnel A 306 allowing for a first tenant endpoint associated with network domain A 302 and a second tenant endpoint associated with network domain B 212 to send and/or receive communication data from one another.

Additionally, or alternatively, a routing device 302, 304 of a network domain 202, 212 of the multi-domain computing resource network 102 may be configured to populate a BGP advertisement packet with additional BGP large communities. In some examples, an additional BGP large community may be included in a BGP advertisement packet for each next hop node (e.g., connectors 312, 314) associated with a routing device 302, 304 and/or local to the network domain 202, 212. The additional BGP large communities for each of the next hop nodes associated with a routing device 302, 304 may be encoded and/or decoded by the routing device 302, 304 using the techniques described with respect FIG. 5. Additionally, or alternatively, a routing device 302, 304 associated with a network domain 202, 212 may be configured to encode and/or decode network egress information associated with the network domain 202, 212 (e.g., bandwidth availability, CPU availability, and/or priority associated with next hop nodes).

Take, for example, a routing device A 302 in network domain A 202 having one or more next hop nodes (e.g., connectors 312). For example, the routing device A 302 may comprise 6 connectors 312 (although any number of connectors may be contemplated). The routing device A 302 may be configured to identify the one or more next hop nodes and generate, for each of the next hop nodes, a BGP large community. The routing device A 302 may also be configured to generate a BGP advertisement packet including each of the BGP large communities corresponding to the 6 next hop nodes. Once generated, the routing device A 302 may send the BGP advertisement packet to network domain B 212 and/or routing device B 304 associated with network domain B 212.

While not illustrated in FIG. 3, network domain B 212 may comprise multiple instances of routing device B 304 (e.g., first routing device B 304 and/or second routing device B 304), such as, for example, router cluster B 214 as described with respect to FIG. 2. With the next hop nodes advertised to additional routing devices 302, 304 of separate network domains 202, 212, a routing device 302, 304 may be configured to make intelligent routing decisions when routing traffic to and/or from a tenant. For example, routing device A 302 may be configured to receive a first BGP advertisement packet from first routing device B 304 associated with network domain B 212. The first BGP advertisement packet may include one or more first BGP large communities associated with one or more first next hop nodes (for example, 3 connector node(s) 314(1)-(3)) associated with first routing device B 304. Additionally, or alternatively, routing device A 302 may receive a second BGP advertisement packet from a second routing device B 304 associated with network domain B 212. The second BGP advertisement packet may include one or more second BGP large communities associated with one or more second next hop nodes (for example, 5 connector node(s) 314(1)-(5)) associated with the second routing device B 304. Routing device A 302 may be configured to store, in a database (e.g., database cluster 208 as described with respect to FIG. 2), such as, for example, a routing information base associated with routing device A 302, respective mappings between the first routing device B 304 of network domain B 212 and the first next hop nodes and/or the second routing device B 304 of network domain B 212 and the second next hop nodes.

When routing device A 302 receives a request, from a first tenant node associated with network domain A 202, to send a data packet to a second tenant node associated with network domain B 212, the routing device A 302 may be configured to make a determination as to sending the data packet to the first routing device B 304 or the second routing device B 304, based at least partly on the first next hop nodes and/or the second next hop nodes. For example, routing device A 302 may be configured to determine a route for sending the data packet from the first tenant node and to the second tenant node. With the route determined, routing device A 302 may then send the data packet to the first routing device B 304 or the second routing device B 304, based on various determinations described in greater detail below. While the below examples are provided, additional determinations may be used to determine the route to transmit the data packet from the first tenant node and to the second tenant node.

In some examples, routing device A 302 may determine that the number of the first next hop nodes (e.g., 5 connectors 314(1)-(5)) associated with the first router B 304 is greater than the number of the second next hop nodes (e.g., 3 connectors 314(1)-(3) associated with the second router B 304, and may configure the route to send the data packet over network tunnel A 306 and network tunnel B 308 established between routing device A 302 and the first routing device B 304.

Additionally, or alternatively, routing device A 302 may determine that the data packet is associated with a first traffic flow type. Routing device A 302 may then determine that the first next hop nodes associated with first router B 304 are associated with a second traffic flow type (e.g., unencrypted traffic flow) and/or that the second next hop nodes associated with second router B 304 are associated with the first traffic flow type (e.g., encrypted traffic flow) that is different from the first traffic flow type, and may configured the route to send the data packet from routing device A 302 and to the second routing device B 304.

Additionally, or alternatively, routing device A 302 may determine, based on the first BGP large communities and/or the second BGP large communities, priorities associated with the first next hop nodes and/or the second next hop nodes, respectively. In such an example, routing device A 302 may determine that the first next hop nodes have a priority that is greater than the priority of the second next hop nodes, and may configure the route to send the data packet from routing device A 302 and to the second routing device B 304.

Additionally, or alternatively, routing device A 302 may be configured to determine a first available bandwidth and/or CPU usage associated with the first next hop nodes associated with the first router B 304 and/or a second available bandwidth and/or CPU usage associated with the second next hop nodes associated with the second router B 304. Routing device A 302 may then determine that the first available bandwidth and/or CPU usage is greater than the second available bandwidth and/or CPU usage, and may configure the route to send the data packet from routing device A 302 and to the first routing device B 304.

Figure 4:
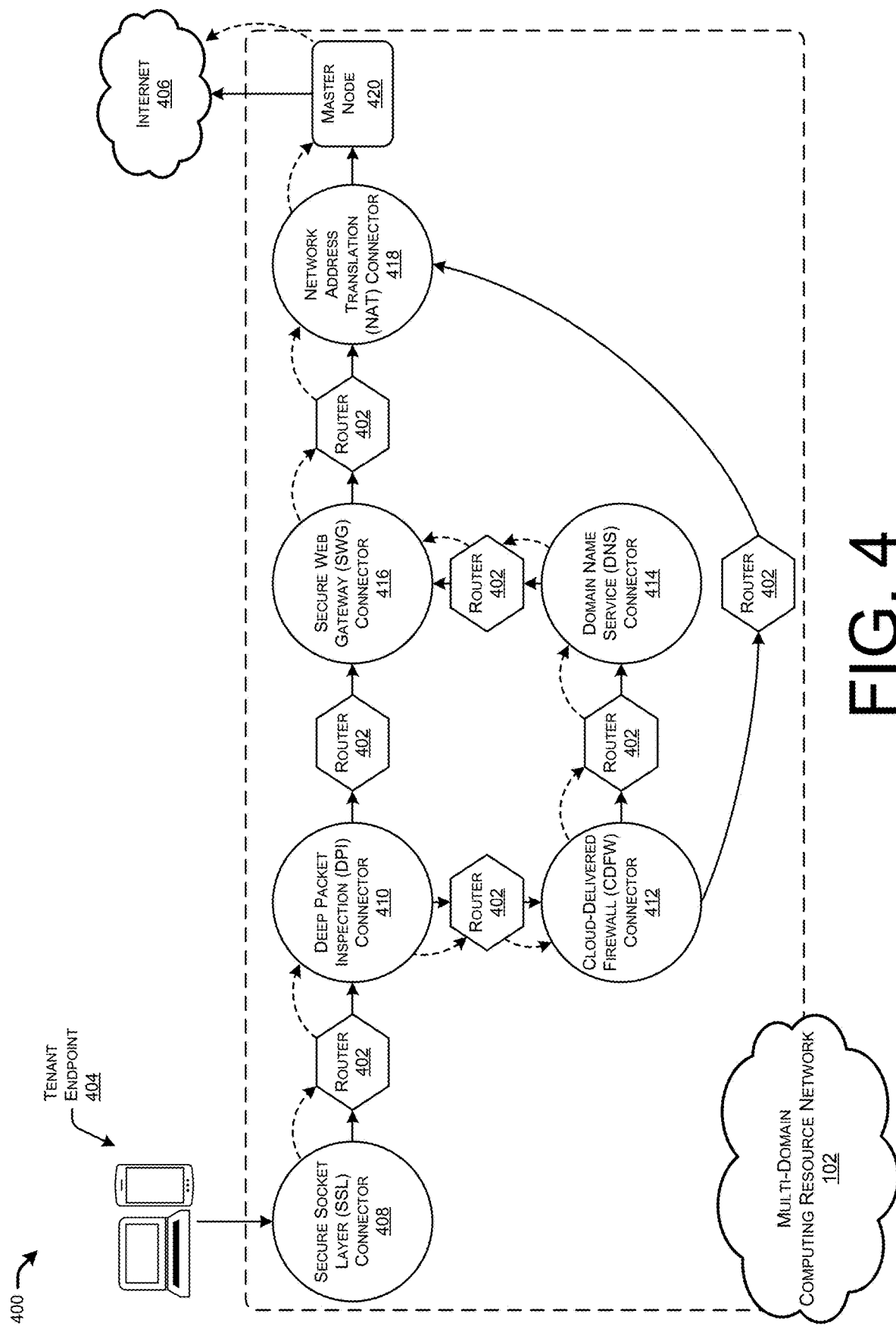
FIG. 4 illustrates an example service chain and an example flow through the service chain as discussed herein.

FIG. 4 illustrates an example service chain 400 and an example flow which a router 402 may transmit a data packet received from a tenant endpoint 404 through the service chain 400 and to a destination endpoint, such as, for example, the internet 406 as discussed herein. In some examples, a master node 420 may be configured to route the data packet from the service chain 400 and to the destination endpoint. In some examples, router 402 may be configured as a single router 402, a router cluster 204, 214 as described with respect to FIG. 2, and/or separate routing devices 302, 304 in separate network domains as described with respect to FIG. 3. As illustrated, the circular "connector" nodes of FIG. 4 (e.g., 408-418) may be configured as connector nodes 108, 222, 224, 312, and/or 314 as described with respect to FIGS. 1-3.

A router 402 of a network domain of the multi-domain computing resource network 102 may be connected to one or more connector nodes 408-418 of the network domain. In some examples, a connector node 408-418 may be configured as a service. In some examples, a connector may be configured as a secure socket layer (SSL) service connector 408, a deep packet inspection (DPI) service connector 410, a cloud-delivered firewall (CDFW) service connector 412, a domain name service (DNS) security connector 414, a secure web gateway (SWG) service connector 416, and/or a network address translation (NAT) service connector 418. Additionally, or alternatively, the SSL connector 408 may be configured as any VPN service allowing one or more tenant endpoints to connect to the network domain, transmit data to additional tenant endpoints, and/or utilize one or more services offered by a connector node 410-418.

While primary global VNI labels are previously described with respect to identifying a tenant endpoint (e.g., a universally unique identifier), a router 402 may utilize secondary global VNI labels corresponding to respective connectors (providing a service) to determine a packet flow configuration for a data packet. In some examples, a packet flow configuration may be configured as a service chain to route a data packet to one or more services, offered by respective connector nodes, before sending the data packet out to the internet and/or a destination endpoint. In some examples, a network administrator may configure various packet flow configurations for various traffic flow types. The router 402 may then translate such a packet flow configuration into secondary global VNI labels, stacked in an order corresponding to the packet flow configuration, such that a data packet is routed to the connector(s) corresponding to the secondary global VNI labels in the order specified by the packet flow configuration.

Take, for example, a router 402 associated with a network domain of a multi-domain computing resource network 102. The router 402 may receive a request, from a connector node configured as a traffic acquisition service (e.g., a VPN allowing one or more tenant endpoints to connect to the network domain), such as, for example, SSL connector 408, to send a data packet from a tenant endpoint and to a destination endpoint. The data packet may include a primary global VNI label associated with the tenant endpoint (e.g., the universally unique identifier). The router 402 may then determine a traffic type associated with the data packet, such as, for example, DNS traffic, hypertext transfer protocol (HTTP) traffic, HTTP secure (HTTPS) traffic, and the like. The router 402 may then identify a packet flow configuration associated with the data packet based at least partly on the traffic type. As previously described, the packet flow configuration may include one or more secondary global VNI labels. The router 402 may then encapsulate the data packet with the secondary global VNI labels in the order specified by the packet flow configuration.

Once the data packet has been encapsulated with the secondary global VNI labels, the router 402 may then send the data packet through a service chain 400 as indicated by the secondary global VNI labels before sending the data packet to the destination endpoint. This may be achieved by the router 402 consuming the outermost secondary global VNI label (e.g., the first of the secondary global VNI labels) to send the data packet from the router 402 and to a first connector (also referred to herein as a network node and/or service node) offering a first service. The first service node may then perform the first service on the data packet before returning the data packet to the router 402. Once the router 402 has received the data packet back from the first connector, the router 402 may then consume the next outermost secondary global VNI label (e.g., the second of the secondary global VNI labels) to send the data packet from the router 402 and to a second connector offering a second service. Similar to the first connector described above, the second connector may then perform the second service on the data packet before returning the data packet to the router 402. This process may be repeated any number of times corresponding to the number of secondary global VNI labels (e.g., 5 secondary global VNI labels would indicate sending the data packet to 5 connectors associated with the secondary global VNI labels, respectively) before sending the data packet from the router 402 to the master node 410, and/or the destination endpoint (e.g., 406).

In some examples, a connector indicated by a secondary global VNI label may not be provisioned in a first network domain of the multi-domain computing resource network in which the router 402 is provisioned, but rather provisioned in a second network domain of the multi-domain computing resource network that is reachable by the router 402. In such an example, the router 402 may send the data packet to an additional routing device (e.g., an additional router 402) of the second network domain via a network tunnel, such as, for example, network tunnel 228 as described with respect to FIG. 2, where the additional routing device may send the data packet to the connector in the second network domain and receive the data packet back from the connector before returning the data packet to the router 402 in the first network domain via the network tunnel.

A customer utilizing the multi-domain computing resource network 102 may wish to route different types of tenant traffic through different services prior to delivering the traffic at a destination endpoint. In some examples, the customer may wish to have a first traffic flow type, such as, for example, DNS traffic, to go through a DPI service 410, a CFW service 412, a DNS security service 414, a SWG service 416, and finally, out to the destination endpoint, such as, for example, the internet 406 via a NAT service 418. As such, an administrative user associated with the customer may access a dashboard associated with the network 102 and configure a packet flow configuration for the first traffic flow type. The packet flow configuration is then translated into a set of tags, such as, global VNI labels, that are then applied to the tenant traffic at a traffic acquisition point, such as, for example, the SSL connector 408. In some examples, the tenant traffic may be encapsulated by individual labels in an order determined by the packet flow configuration (e.g., the following order DPI service 410, CFW service 412, DNS security service 414, SWG service 416, and lastly NAT service 418). Additionally, or alternatively, this packet flow configuration may be stored in a datastore associated with the router 402 for future use of routing additional tenant traffic.

An example of the traffic flow indicated by the packet flow configuration described above is depicted in FIG. 4 by the flow arrows with the dashed lines. Once the router 402 receives the tenant traffic from the SSL connector 408, the router 402 may identify the first service indicated by the global VNI labels and send the packet to the DPI connector 410. Once the DPI service is performed on the tenant traffic, the tenant traffic is returned to the router 402. Next, the router 402 may identify the second service indicated by the global VNI labels and send the packet to the CDFW connector 412. Once the CDFW service is performed on the tenant traffic, the tenant traffic is returned to the router 402. Next, the router 402 may identify the third service indicated by the global VNI labels and send the packet to the DNS connector 414. Once the DNS security service is performed on the tenant traffic, the tenant traffic is returned to the router 402. Next, the router 402 may identify the fourth service indicated by the global VNI labels and send the packet to the SWG connector 416. Once the SWG service is performed on the tenant traffic, the tenant traffic is returned to the router 402. And finally, the router 402 may identify the fifth and last service indicated by the global VNI labels and send the packet to the NAT connector 418. Once the NAT service is performed on the tenant traffic, the tenant traffic is returned to the router 402. Additionally, or alternatively, the tenant traffic may be sent to the master node 420 associated with the network domain prior to sending the tenant traffic to the destination endpoint (e.g., the internet 406).

While the example packet flow configuration is provided, any number of packet flow configurations may be provided specific to additional traffic types (e.g., HTTP, HTTPS, etc.) and/or users associated with the tenant (e.g., internet technology users, general users, managers, administrators, etc.).

Figure 5:
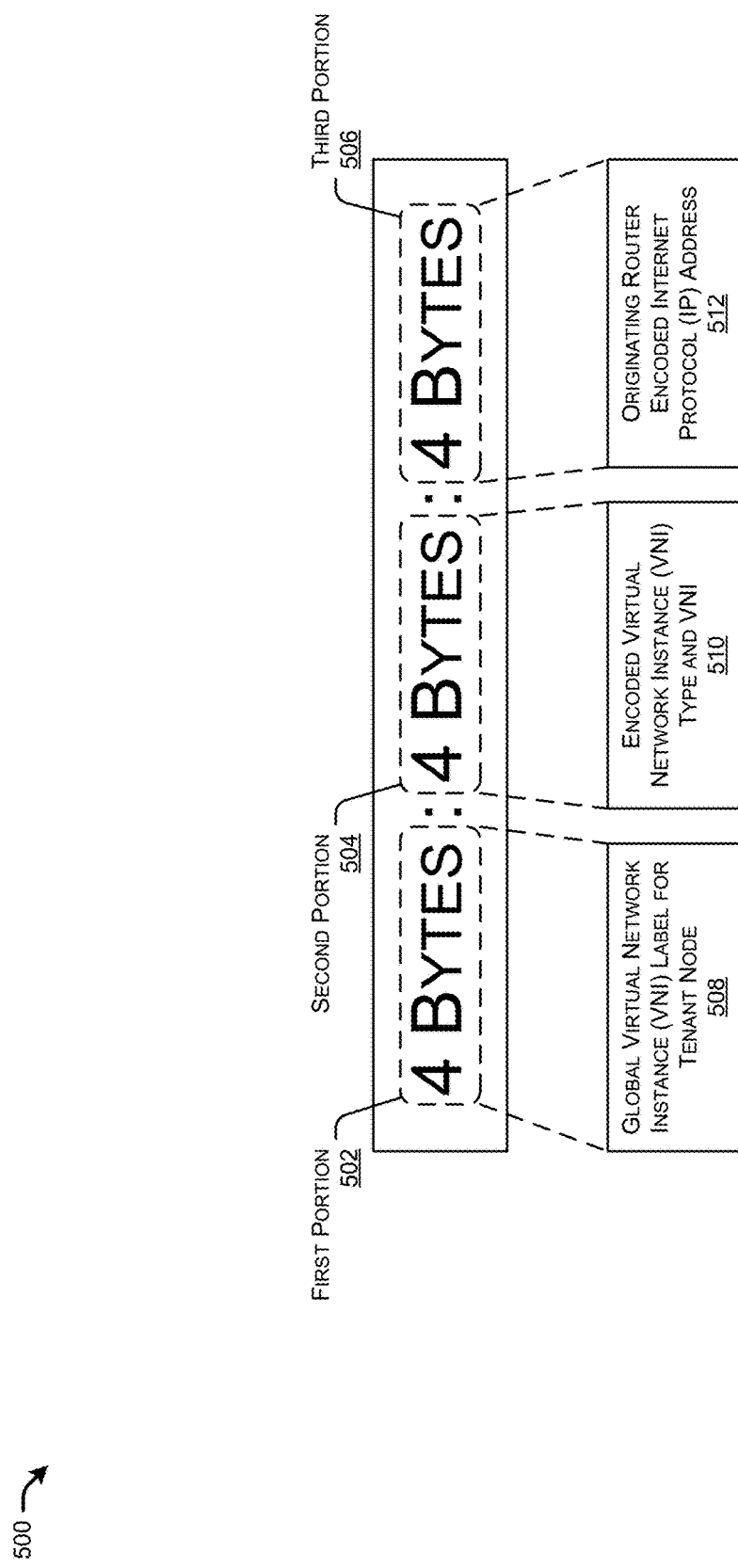
FIG. 5 illustrates an example border gateway protocol (BGP) large community including three 4-byte sections indicating a global VNI tenant label, an encoded VNI type and VNI, and/or an originating router encoded internet protocol (IP) address.

FIG. 5 illustrates an example border gateway protocol (BGP) large community 500 including a first 4-byte portion 502, a second 4-byte portion 504, and/or a third 4-byte portion 506. In some examples, the portions 502, 504, and/or 506 of the BGP large community 500 may indicate a global VNI tenant label 508, an encoded VNI type and VNI 510, and/or an originating router encoded internet protocol (IP) address 512.

As described with respect to FIGS. 1-4, the routing device(s) of a network domain may be configured to generate global virtual network instance (VNI) labels (e.g., MPLS, VXLAN, GENEVE, etc.) associated with tenant nodes in the network domain and connected to the routing device. Such global VNI labels may provide the benefits offered by a specific VNI (e.g., an MPLS network) without utilizing the specific VNI (e.g., an actual MPLS network) to run an application. Instead, routing devices of separate network domains of the multi-domain network may utilize network tunnels, such as, for example, network tunnel 228 as described with respect to FIG. 2, (e.g., configured in the network overlay) to connect to one another directly and support VNI advantages on top of the tunnels without requiring the knowledge of the underlying network transport (e.g., configured in the network underlay) which the network tunnels run on top of In some examples, a routing device may generate and send a BGP advertisement packet to one or more of the additional network domains of the multi-domain network. The BGP advertisement packet may include one or more BGP large communities 500 having one or more portions 502, 504, and/or 506 indicating various global VNI labels, addresses, and/or indications. In some examples, a BGP large community may include three separate 4-byte portions for encoding data.

Take, for example a first tenant node associated with a first routing device of a first network domain of the multi-domain computing resource network 102. The first routing device may be configured to determine that the first tenant node is connected to the first routing device (e.g., the first routing device may be responsible for routing communications to and from the first tenant node) and may generate a first BGP advertisement packet including a first BGP large community 500 associated with the first tenant node. In some examples, the BGP advertisement packet may be configured to include a BGP large community 500 for each of the individual tenant nodes associated with the first routing device. The first routing device may then encode a first global VNI label associated with the first tenant node 508 (e.g., a universally unique identifier (UUID) of the first tenant node) into a first portion 502 of the BGP large community 500. Additionally, or alternatively, the first routing device may encode an indication of the VNI type of the virtual network 510 being utilized into a second portion 504 of the BGP large community 500. Additionally, or alternatively, the first routing device may encode a first address of a first network tunnel endpoint associated with the first (originating) routing device 512 into a third portion 506 of the BGP large community 500. In some examples, the first address 512 may be an Internet Protocol version 4 (IPv4) address or include a mapping to an Internet Protocol version 6 (IPv6) tunnel address. In examples where the first address of the first network tunnel endpoint associated with the first routing device 512 is an IPv6 address, the encoded indication of the VNI type 510 may indicate that the first address 512 is an IPv6 address. Additionally, or alternatively, the encoded indication of the VNI type 510 may include configuring one or more of the 4-bytes in the third portion 506 (or in any of the other portions 502 or 504) as an indicator (e.g., an integer or any other value that may be mapped in a database) that may be used to look up a corresponding IPv6 tunnel address. This may be achieved by performing a first lookup, based at least partly on the global VNI label associated with a tenant node 508 indicating the UUID of the tenant node and/or the VNI type of the virtual network 510, and then performing a second lookup, based at least partly on the indicator encoded into the third portion 506, to determine the corresponding IPv6 address mapped to the indicator and associated with the tenant node. Additionally, or alternatively, it may be assumed by the routing devices that the first address of the first network tunnel endpoint associated with the first routing device 512 is an IPv4 address. Once one or more of the portions of the BGP large community have been encoded, the first routing device may send the first BGP advertisement packet to a second network domain (or any number of additional network domains) associated with the multi-domain computing resource network 102.

The routing devices may also be configured to decode any BGP large communities 500 in BGP advertisement packets received from additional network domains and/or routing device(s). For example, the first routing device may receive a second BGP advertisement packet including a second BGP large community 500 from a second routing device associated with a second network domain of the multi-domain computing resource network 102. That is, continuing from the example above, the first routing device may then decode the first portion 502 of the second BGP large community 500 including a second global VNI label corresponding to a second tenant node 508 associated with the second routing device of the second network domain, the second portion 504 of the second BGP large community 500 including an indication of a VNI type 510 associated with the second network domain and/or an indication that the second address of the second tunnel endpoint is an IPv6 address, and/or the third portion 506 of the second BGP large community 500 including a second address of a second tunnel endpoint associated with the second routing device 512. In examples where the second address of the second tunnel endpoint is configured as an IPv6 address, the first and second lookup, as described above, may be performed by a routing device. With the information from the second BGP large community 500 decoded, the first routing device may then store, in the database associated with the first routing device, a mapping between the second global VNI label 508, the second address of the second tunnel endpoint 512, and/or the VNI type 510 associated with the second network domain.

With the first routing device of the first network domain having the second address of the second tunnel endpoint of the second routing device 512 of the second network domain and/or the second routing device of the second network domain having the first address of the first tunnel endpoint of the first routing device 512 of the first network domain, a network tunnel, such as, for example, the network tunnel 228 as described with respect to FIG. 2, may be established between the first routing device and the second routing device on top of the underlying network transport, where data may be routed to and/or from the first tunnel endpoint and to the second tunnel endpoint and/or to and/or from the second tunnel endpoint and to the first tunnel endpoint allowing for the first tenant and the second tenant to send and/or receive communication data from one another.

FIGS. 6-15 illustrate flow diagrams of example methods 600-1500 and that illustrate aspects of the functions performed at least partly by the computing resource network 102, the routing device(s) 106, the service(s) 110(1)-(N), the database(s) 208, and/or the API server 206 as described in FIGS. 1-5. The logical operations described herein with respect to FIGS. 6-15 may be implemented (1) as a sequence of computer-implemented acts or program modules running on a computing system and/or (2) as interconnected machine logic circuits or circuit modules within the computing system. In some examples, the method(s) 600-1500 may be performed by a system comprising one or more processors and one or more non-transitory computer-readable media storing computer-executable instructions that, when executed by the one or more processors, cause the one or more processors to perform the method(s) 600-1500.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6-15 and described herein. These operations can also be performed in parallel, or in a different order than those described herein. Some or all of these operations can also be performed by components other than those specifically identified.

Although the techniques described in this disclosure is with reference to specific components, in other examples, the techniques may be implemented by less components, more components, different components, or any configuration of components.

Figure 6:
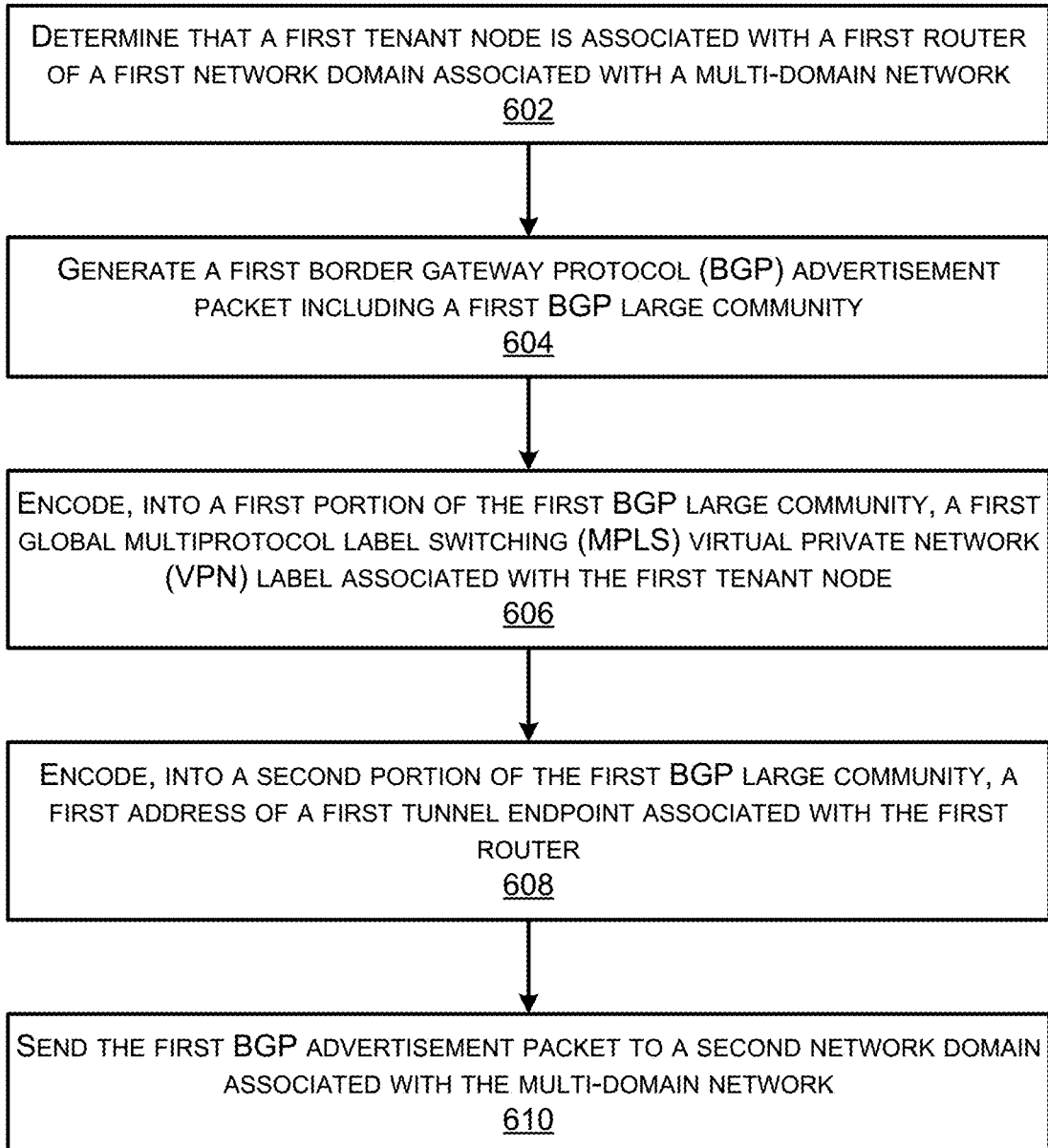
FIG. 6 illustrates a flow diagram of an example method for a routing device to encode and send a BGP advertisement including a BGP large community encoded with at least a global VNI label and/or an originating router IP address.

FIG. 6 illustrates a flow diagram of an example method 600 for a routing device (e.g., a router and/or a route reflector) to encode and send a BGP advertisement including a BGP large community encoded with at least a global VNI label and/or an originating routing device IP address. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the BGP large community may be configured as the BGP large community 500 as described with respect to FIG. 5.

At 602, the method 600 includes determining that a first tenant node is associated with a first router of a first network domain associated with a multi-domain network. In some examples, the multi-domain network may be configured as the multi-domain computing resource network 102 as described with respect to FIG. 1. In some examples, the first router may be connected to the first tenant node via a network connector node. In some examples, the network connector node may be configured as a VPN service node, allowing a tenant node to connect to the multi-domain network. In some examples, the connector node may be configured as a service node 110(1)-(4) as described with respect to FIG. 1.

At 604, the method 600 includes generating a first border gateway protocol (BGP) advertisement packet including a first BGP large community. Additionally, or alternatively, the first BGP advertisement packet may include any number of BGP large communities corresponding to a number of tenant nodes associated with the first routing device.

At 606, the method 600 includes encoding, into a first portion of the first BGP large community, a first global virtual network instance (VNI) label associated with the first tenant node. In some examples, the first portion of the first BGP large community may correspond to the first portion 502 and/or the first global VNI label may correspond to the global VNI label for tenant node 508 as described with respect to FIG. 5

At 608, the method 600 includes encoding, into a second portion of the first BGP large community, a first address of a first tunnel endpoint associated with the first router. In some examples, the second portion of the first BGP large community may correspond to the third portion 506 and/or the first address may correspond to the originating router encoded IP address 512 as described with respect to FIG. 5.

At 610, the method 600 includes sending the first BGP advertisement packet to a second network domain associated with the multi-domain network. In some examples, the first BGP advertisement packet may be sent to a second routing device associated with the second network domain.

In some examples, the first address of the first tunnel endpoint may be an Internet Protocol version 4 (IPv4) address.

In some examples, the multi-domain network is a virtual network. Additionally, or alternatively, the method 600 may include encoding, into a third portion of the first BGP large community, an indication of a virtual network instance type of the virtual network. In some examples, the third portion of the first BGP large community may correspond to the second portion 504 and/or the indication of the virtual network instance type of the virtual network may correspond to the encoded VNI type and VNI 510 as described with respect to FIG. 5. Additionally, or alternatively, the virtual network instance type may indicate that the address of the first tunnel endpoint includes an indication of an Internet Protocol version 6 (IPv6) address.

In some examples, the first global VNI label may include at least one of a global MPLS VPN label, a global VXLAN label, and/or a global GENEVE label.

Additionally, or alternatively, the method 600 includes receiving, from a second router of the second network domain, a second BGP advertisement packet including a second BGP large community. Additionally, or alternatively, the method 600 includes storing, in a database associated with the first router, the second BGP large community in association with the second router of the second network domain.

Additionally, or alternatively, the method 600 may include determining, based at least in part on the second BGP large community, a second address of a second tunnel endpoint associated with the second router. Additionally, or alternatively, the method 600 may include establishing a network tunnel connecting the first tunnel endpoint to the second tunnel endpoint. In some examples, the network tunnel may correspond to the network tunnel 228 as described with respect to FIG. 2.

Additionally, or alternatively, the method 600 may include routing first data from the first tunnel endpoint and to the second tunnel endpoint based at least in part on the network tunnel. Additionally, or alternatively, the method 600 may include routing second data to the first tunnel endpoint and from the second tunnel endpoint based at least in part on the network tunnel.

FIG. 7 illustrates a flow diagram of an example method 700 for a routing device to receive and decode a BGP advertisement including a BGP large community encoded with at least a global VNI label and/or an originating router IP address. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the BGP large community may be configured as the BGP large community 500 as described with respect to FIG. 5.

At 702, the method 700 includes receiving, at a first router of a first network domain of a multi-domain network and from a second router of a second network domain of the multi-domain network, a first border gateway protocol (BGP) advertisement packet including a first BGP large community. In some examples, the multi-domain network may be configured as the multi-domain computing resource network 102 as described with respect to FIG. 1.

At 704, the method 700 includes decoding, from a first portion of the first BGP large community, a first global virtual network instance (VNI) label corresponding to a first tenant node associated with the second router.

At 706, the method 700 includes decoding, from a second portion of the first BGP large community, a first address of a first tunnel endpoint associated with the second router.

At 708, the method 700 includes storing, in a database associated with the first router, a mapping between the first global VNI label and the first address of the first tunnel endpoint.

In some examples, the first address of the first tunnel endpoint may be an Internet Protocol version 4 (IPv4) address.

In some examples, the multi-domain network is a virtual network. Additionally, or alternatively, the method 700 includes decoding, from a third portion of the first BGP large community, an indication of a virtual network instance type of the virtual network.

In some examples, the multi-domain network may be a virtual network. Additionally, or alternatively, the method 700 includes decoding, from a third portion of the first BGP large community, an indication of a virtual network instance type of the virtual network, the virtual network instance type indicating that the address of the first tunnel endpoint is an Internet Protocol version 6 (IPv6) address.

Additionally, or alternatively, the method 700 includes determining that a second tenant node is associated with the first router. Additionally, or alternatively, the method 700 includes generating a second BGP advertisement packet including a second BGP large community. Additionally, or alternatively, the method 700 includes encoding, into a first portion of the second BGP large community, a second global VNI label corresponding to the second tenant node associated with the first router. Additionally, or alternatively, the method 700 includes encoding, into a second portion of the second BGP large community, a second address of a second tunnel endpoint associated with the first router. Additionally, or alternatively, the method 700 includes sending the second BGP advertisement packet to the second network domain associated with the multi-domain network.

Additionally, or alternatively, the method 700 includes receiving, at the first router and from the second tenant node of the first network domain, a request to send a data packet to the first tenant node of the second network domain. Additionally, or alternatively, the method 700 includes determining, by the first router and based at least in part on the mapping in the database, that the first tenant node is associated with the first global VNI label and the first address of the first tunnel endpoint. Additionally, or alternatively, the method 700 includes determining, by the first router and based at least in part on the mapping in the database, a route for sending the data packet from the second tenant node to the first tenant node. Additionally, or alternatively, the method 700 includes sending the data packet from the first router and to the second router based at least in part on the route.

Figure 8:
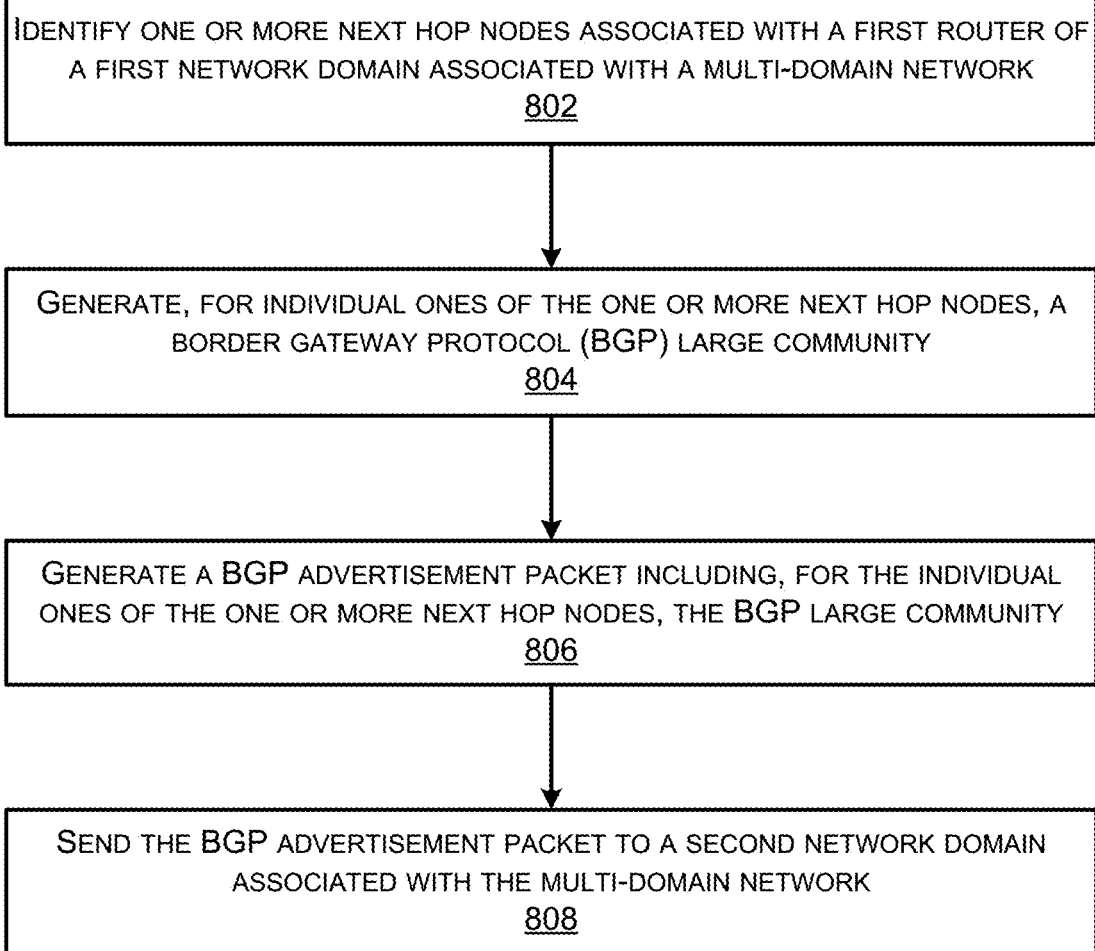
FIG. 8 illustrates a flow diagram of an example method for a routing device to encode and send a BGP advertisement including one or more encoded BGP large communities associated with each next hop node local to the routing device.

FIG. 8 illustrates a flow diagram of an example method 800 for a routing device to encode and send a BGP advertisement including one or more encoded BGP large communities associated with each next hop node local to the routing device. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the BGP large community may be configured as the BGP large community 500 as described with respect to FIG. 5.

At 802, the method 800 includes identifying one or more next hop nodes associated with a first router of a first network domain associated with a multi-domain network. In some examples, the multi-domain network may be configured as the multi-domain computing resource network 102 as described with respect to FIG. 1.

At 804, the method 800 includes generating, for individual ones of the one or more next hop nodes, a border gateway protocol (BGP) large community.

At 806, the method 800 includes generating a BGP advertisement packet including, for the individual ones of the one or more next hop nodes, the BGP large community.

At 808, the method 800 includes sending the BGP advertisement packet to a second network domain associated with the multi-domain network.

Additionally, or alternatively, the method 800 includes for the individual ones of the one or more next hop nodes, encoding, into a portion of the BGP large community, network egress information associated with the first network domain.

Additionally, or alternatively, the method 800 includes for an individual node of the one or more next hop nodes, encoding, into a portion of the BGP large community, a global virtual network instance (VNI) label associated with the individual node.

Additionally, or alternatively, the method 800 includes for individual ones of the one or more next hop nodes, encoding, into a portion of the BGP large community, an address of a tunnel endpoint associated with the first router. In some examples, the address of the tunnel endpoint may be an Internet Protocol version 4 (IPv4) address.

In some examples, the multi-domain network may be a virtual network. Additionally, or alternatively, the method 800 includes for individual ones of the one or more next hope nodes, encoding, into a portion of the BGP large community, an indication of a virtual network instance type of the virtual network.

In some examples, the virtual network instance type may indicate that an address of a first tunnel endpoint associated with the first router is an Internet Protocol version 6 (IPv6) address.

FIG. 9 illustrates a flow diagram of an example method 900 for a first routing device in a first network domain to receive and decode a BGP advertisement including one or more encoded BGP large communities associated with each next hop local to a second routing device in a second network domain, and further determining a route to send a data packet from the first network domain to the second network domain. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the BGP large community may be configured as the BGP large community 500 as described with respect to FIG. 5.

At 902, the method 900 includes receiving, at a first router of a first network domain associated with a multi-domain network and from a second router of a second network domain associated with the multi-domain network, a first border gateway protocol (BGP) advertisement packet including one or more first BGP large communities associated with one or more first next hop nodes associated with the second router. In some examples, the multi-domain network may be configured as the multi-domain computing resource network 102 as described with respect to FIG. 1.

At 904, the method 900 includes receiving, at the first router and from a third router of the second network domain, a second BGP advertisement packet including one or more second BGP large communities associated with one or more second next hop nodes associated with the third router.

At 906, the method 900 includes receiving, at the first router and from a first tenant node of the first network domain, a request to send a data packet to a second tenant node of the second network domain.

At 908, the method 900 includes determining, by the first router and based at least in part on the first BGP advertisement packet and the second BGP advertisement packet, a route for sending the data packet from the first tenant node to the second tenant node.

At 910, the method 900 includes sending the data packet from the first router and to one of the second router or the third router based at least in part on the route.

Additionally, or alternatively, the method 900 includes storing, in a routing information base associated with the first router, the one or more first BGP large communities in association with the one or more first next hop nodes associated with the second router.

Additionally, or alternatively, the method 900 includes determining that a first number of the one or more first next hop nodes associated with the second router is greater than a second number of the one or more second next hop nodes associated with the third router. Additionally, or alternatively, the method 900 includes sending the data packet from the first router and to the second router based at least in part on determining that the first number is greater than the second number.

Additionally, or alternatively, the method 900 includes determining that the data packet is associated with a first traffic flow type.

Additionally, or alternatively, the method 900 includes determining a routing decision based at least in part on at least one of the one or more first next hop nodes are associated with the first traffic flow type and/or the one or more second next hop nodes are associated with a second traffic flow type that is different from the first traffic flow type. Additionally, or alternatively, the method 900 includes sending the data packet from the first router and to the second router based at least in part on the routing decision.

Additionally, or alternatively, the method 900 includes determining, based at least in part on the one or more first BGP large communities, a first priority associated with at least one of the one or more first next hop nodes. Additionally, or alternatively, the method 900 includes determining, based at least in part on the one or more second BGP large communities, a second priority associated with at least one of the one or more second hop nodes. Additionally, or alternatively, the method 900 includes determining that the first priority is greater than the second priority. Additionally, or alternatively, the method 900 includes based at least in part on determining that the first priority is greater than the second priority, sending the data packet from the first router and to the second router.

In some examples, the route is a first route connecting a first tunnel endpoint associated with the first router to a second tunnel endpoint associated with the second router. Additionally, or alternatively, the method 900 includes determining, by the first router and based at least in part on the second BGP advertisement packet, a second route connecting the first tunnel endpoint to a third tunnel endpoint associated with the third router.

Additionally, or alternatively, the method 900 includes determining a first available bandwidth associated with the one or more first next hop nodes. Additionally, or alternatively, the method 900 includes determining a second available bandwidth associated with the one or more second next hop nodes. Additionally, or alternatively, the method 900 includes determining that the first available bandwidth is greater than the second available bandwidth. Additionally, or alternatively, the method 900 includes based at least in part on determining that the first available bandwidth is greater than the second available bandwidth, sending the data packet from the first router and to the second router using the route.

Figure 10:
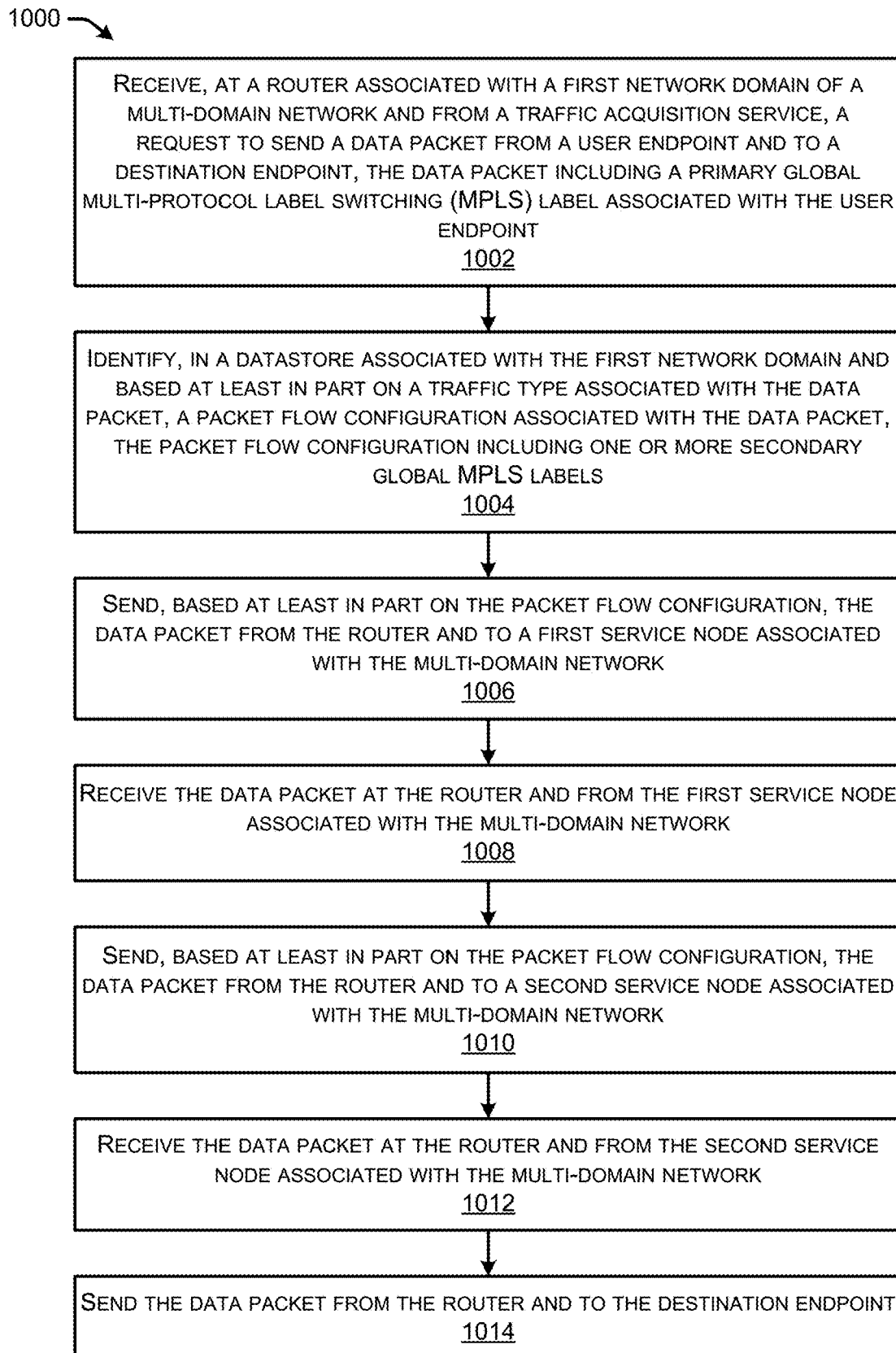
FIG. 10 illustrates a flow diagram of an example method for a routing device to determine a packet flow configuration for sending a data packet from a tenant endpoint, through a service chain, and to a destination endpoint.

FIG. 10 illustrates a flow diagram of an example method 1000 for a routing device to determine a packet flow configuration for sending a data packet from a tenant endpoint, through a service chain, and to a destination endpoint. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the packet flow configuration may correspond to the packet flow configuration as described with respect to FIGS. 4 and 5.

At 1002, the method 1000 includes receiving, at a router associated with a first network domain of a multi-domain network and from a traffic acquisition service, a request to send a data packet from a user endpoint and to a destination endpoint, the data packet including a primary global virtual network instance (VNI) label associated with the user endpoint. In some examples, the multi-domain network may be configured as the multi-domain computing resource network 102 as described with respect to FIG. 1. In some examples, a service node of the service chain may correspond to a connector 408-418 as described with respect to FIG. 4.

At 1004, the method 1000 includes identifying, in a datastore associated with the first network domain and based at least in part on a traffic type associated with the data packet, a packet flow configuration associated with the data packet, the packet flow configuration including one or more secondary global VNI labels.

At 1006, the method 1000 includes sending, based at least in part on the packet flow configuration, the data packet from the router and to a first service node associated with the multi-domain network.

At 1008, the method 1000 includes receiving the data packet at the router and from the first service node associated with the multi-domain network.

At 1010, the method 1000 includes sending, based at least in part on the packet flow configuration, the data packet from the router and to a second service node associated with the multi-domain network.

At 1012, the method 1000 includes receiving the data packet at the router and from the second service node associated with the multi-domain network.

At 1014, the method includes sending the data packet from the router and to the destination endpoint.

In some examples, the first service node may offer a service comprising at least one of a deep packet inspection (DPI) service, a cloud-delivered firewall (CDFW) service, a network address translation (NAT) service, a secure web gateway (SWG) service, a domain name service (DNS) layer security service, a cloud access security broker (CASB) service.

Additionally, or alternatively, the method 1000 includes sending the data packet to the first service node is based at least in part on a first secondary global VNI label of the one or more secondary global VNI labels. In some examples, the first secondary global VNI label indicates a first service offered by the first service node. Additionally, or alternatively, the method 1000 includes sending the data packet to the second service node is based at least in part on a second secondary global VNI label of the one or more secondary global VNI labels. In some examples, the second secondary global VNI label indicates a second service offered by the second service node.

Additionally, or alternatively, the method 1000 includes receiving, at the router and from the traffic acquisition service, an additional request to send an additional data packet from the user endpoint and to the destination endpoint. In some examples, the additional data packet includes the primary global VNI label associated with the user endpoint. Additionally, or alternatively, the method 1000 includes identifying, in the datastore and based at least in part on an additional traffic type associated with the additional data packet, an additional packet flow configuration associated with the additional data packet. In some examples, the additional packet flow configuration including one or more additional secondary global VNI labels, and wherein the additional traffic type is different from the traffic type. Additionally, or alternatively, the method 1000 includes sending, based at least in part on the additional packet flow configuration, the additional data packet from the router and to a third service node associated with the multi-domain network. Additionally, or alternatively, the method 1000 includes receiving the data packet at the router and from the third service node associated with the multi-domain network. Additionally, or alternatively, the method 1000 includes sending the data packet from the router and to the destination endpoint.

Additionally, or alternatively, the method 1000 includes determining that the first service node is associated with a second router of a second network domain associated with the multi-domain network. Additionally, or alternatively, the method 1000 includes determining an address of a tunnel endpoint associated with the second router. Additionally, or alternatively, the method 1000 includes establishing a network tunnel connecting a second tunnel endpoint associated with the first router to the second tunnel endpoint. In some examples, sending the data packet to the first service node comprises sending the data packet through the network tunnel from the first router and to the second router. In some examples, receiving the data packet from the first service node comprises receiving the data packet through the network tunnel at the first router and from the second router.

In some examples, identifying the packet flow configuration may comprise identifying the packet flow configuration associated with the data packet based at least in part on the primary global VNI label associated with the user endpoint.

In some examples, the one or more secondary global VNI labels are stacked in the packet flow configuration in an order and indicate one or more services that the traffic type requires the data packet be sent to according to the order.

Figure 11:
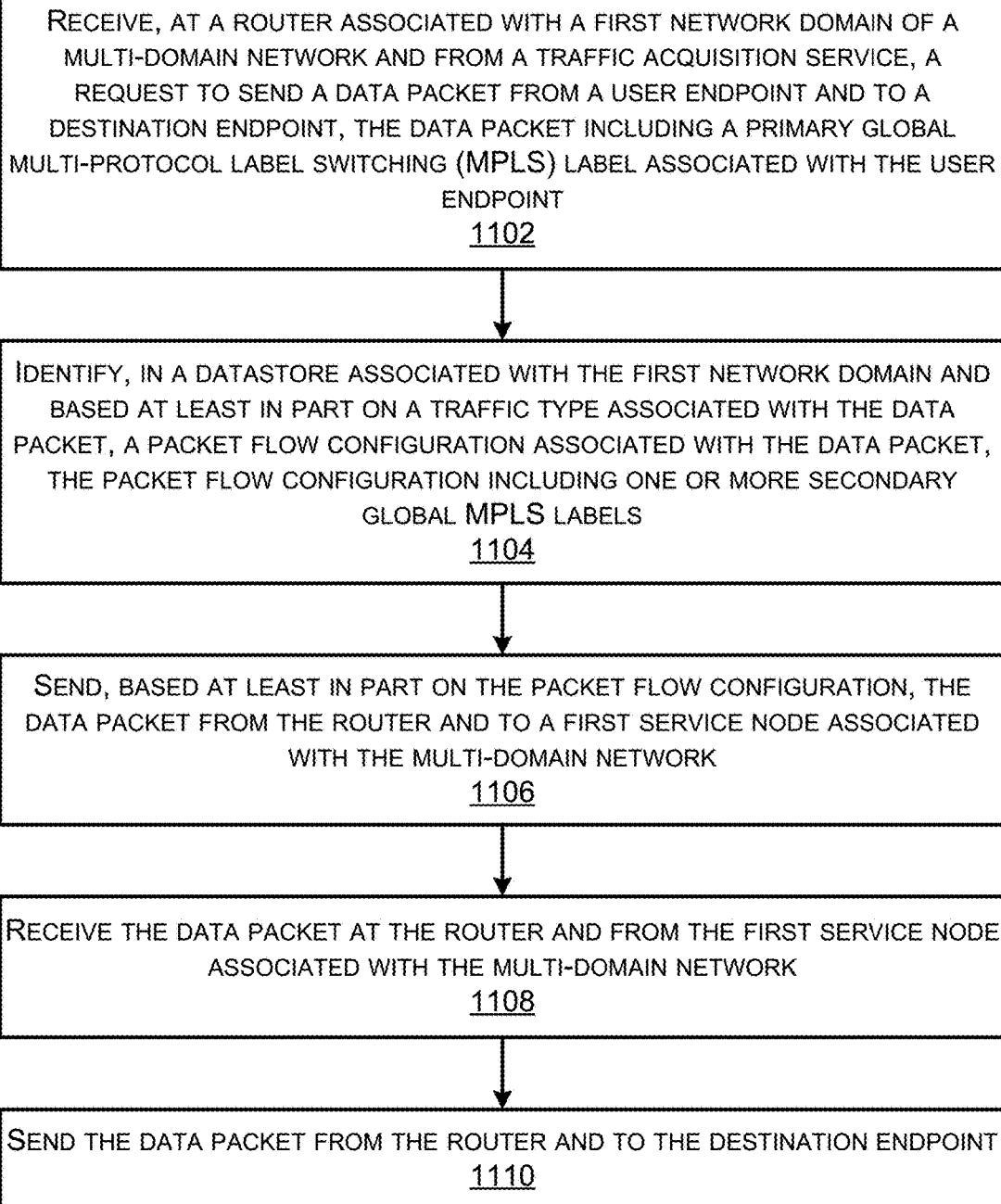
FIG. 11 illustrates a flow diagram of another example method for a routing device to determine a packet flow configuration for sending a data packet from a tenant endpoint, through a service chain, and to a destination endpoint.

FIG. 11 illustrates a flow diagram of another example method 1100 for a routing device to determine a packet flow configuration for sending a data packet from a tenant endpoint, through a service chain, and to a destination endpoint. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the packet flow configuration may correspond to the packet flow configuration as described with respect to FIGS. 4 and 5. In some examples, a service node of the service chain may correspond to a connector 408-418 as described with respect to FIG. 4.

At 1102, the method 1100 includes receiving, at a router associated with a first network domain of a multi-domain network and from a traffic acquisition service, a request to send a data packet from a user endpoint and to a destination endpoint, the data packet including a primary global virtual network instance (VNI) label associated with the user endpoint. In some examples, the multi-domain network may be configured as the multi-domain computing resource network 102 as described with respect to FIG. 1.

At 1104, the method 1100 includes identifying, in a datastore associated with the first network domain and based at least in part on a traffic type associated with the data packet, a packet flow configuration associated with the data packet, the packet flow configuration including one or more secondary global VNI labels.

At 1106, the method 1100 includes sending, based at least in part on the packet flow configuration, the data packet from the router and to a first service node associated with the multi-domain network.

At 1108, the method 1100 includes receiving the data packet at the router and from the first service node associated with the multi-domain network.

At 1110, the method 1100 includes sending the data packet from the router and to the destination endpoint.

In some examples, the first service node may offer a service comprising at least one of a deep packet inspection (DPI) service, a cloud-delivered firewall (CDFW) service, a network address translation (NAT) service, a secure web gateway (SWG) service, a domain name service (DNS) layer security service, a cloud access security broker (CASB) service.

Additionally, or alternatively, the method 1100 includes sending, prior to sending the data packet to the destination endpoint and based at least in part on the packet flow configuration, the data packet from the first router and to a second router associated with a second network domain of the multi-domain network. In some examples, the second router is configured to route the data packet to a second service node associated with the second network domain. Additionally, or alternatively, the method 1100 includes receiving, prior to sending the data packet to the destination endpoint, the data packet at the first router and from the second router associated with the second network domain.

Additionally, or alternatively, the method 1100 includes sending the data packet to the first service node based at least in part on a first secondary global VNI label of the one or more secondary global VNI labels. In some examples, the first secondary global VNI label indicates a first service offered by the first service node.

Additionally, or alternatively, the method 1100 includes identifying the packet flow configuration associated with the data packet based at least in part on the primary global VNI label associated with the user endpoint.

In some examples, the one or more secondary global VNI labels are stacked in the packet flow configuration in an order and indicate one or more services that the traffic type requires the data packet be sent to according to the order.

Figure 12:
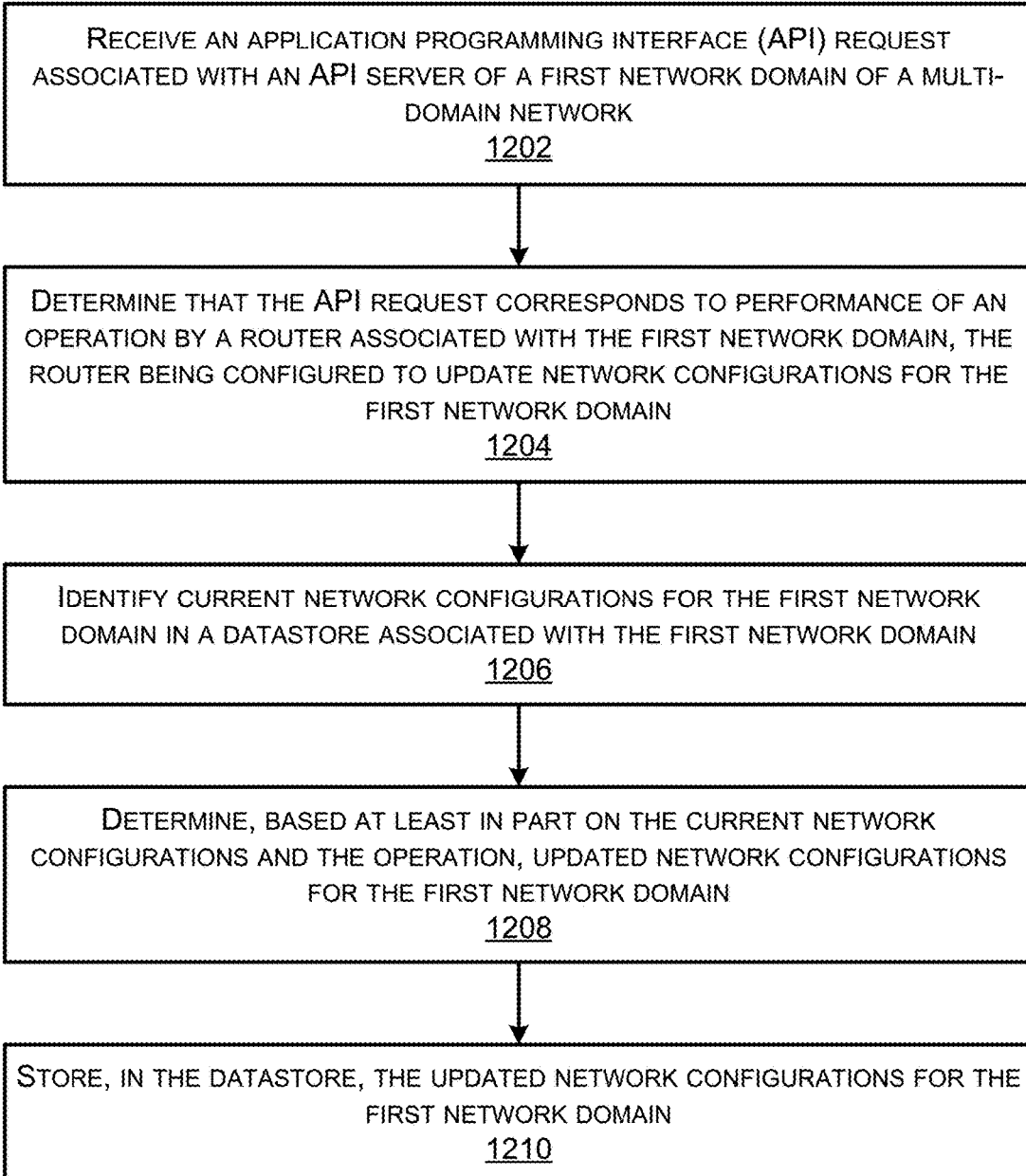
FIG. 12 illustrates a flow diagram of an example method for determining and storing updated network configuration data for a network domain of a multi-domain network based on current network configuration data of the network domain and an API request, configured to cause a routing device of the network domain to perform an operation, received at an API server.

FIG. 12 illustrates a flow diagram of an example method 1200 for determining and storing updated network configuration data for a network domain of a multi-domain network based on current network configuration data of the network domain and an API request, configured to cause a routing device of the network domain to perform an operation, received at an API server. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the API server may correspond to the API server 206 as described with respect to FIG. 2.

At 1202, the method 1200 includes receiving an application programming interface (API) request associated with an API server of a first network domain of a multi-domain network. In some examples, the multi-domain network may be configured as the multi-domain computing resource network 102 as described with respect to FIG. 1. In some examples, the API request may correspond to the API request as described with respect to FIG. 2.

At 1204, the method 1200 includes determining that the API request corresponds to performance of an operation by a router associated with the first network domain, the router being configured to update network configurations for the first network domain.

At 1206, the method 1200 includes identifying current network configurations for the first network domain in a datastore associated with the first network domain.

At 1208, the method 1200 includes determining, based at least in part on the current network configurations and the operation, updated network configurations for the first network domain.

At 1210, the method 1200 includes storing, in the datastore, the updated network configurations for the first network domain.

Additionally, or alternatively, the method 1200 includes identifying a change in the current network configurations for the first network domain caused at least partly by the performance of the operation, wherein determining the updated network configurations is based at least in part on the change. Additionally, or alternatively, the method 1200 includes sending, from the router, a border gateway protocol (BGP) advertisement to an edge device in a second network domain of the multi-domain network, the BGP advertisement indicating the updated network configurations for the first network domain.

In some examples, the API request is received from a network connector node associated with the first network domain. Additionally, or alternatively, the method 1200 includes sending, from the router and to the network connector node, the updated network configurations for the first network domain.

In some examples, the operation comprises at least one of creating, reading, updating, and deleting a virtual routing and forwarding (VRF) associated with the first network domain. Additionally, or alternatively, the method 1200 includes sending, to a tenant of one or more tenants associated with the first network domain, a global identifier associated with the VRF. In some examples, the API request is received from the tenant.

In some examples, the operation comprises at least one of creating, reading, updating, and deleting a network connector node. In some examples, the network connector node connecting the first network domain to at least one of a second network domain of the multi-domain network via a network tunnel and/or a third network domain separate from the multi-domain network. Additionally, or alternatively, the method 1200 includes sending, to a tenant of one or more tenants associated with the first network domain, a global identifier associated with the network connector node, wherein API request is received from the tenant.

In some examples, the operation comprises at least one of creating, reading, updating, and deleting a network route for transmitting communications through one or more network connector nodes of the first network domain and out of the first network domain to one or more second network domains of the multi-domain network. Additionally, or alternatively, the method 1200 includes configuring, by the router, the one or more network connector nodes to transmit communications through the first network domain and out of the first network domain to one or more additional network domains according to the network route.

In some examples, the API request is a first API request. Additionally, or alternatively, the method 1200 includes receiving, from an admin device associated with a tenant of one or more tenants associated with the first network domain, a second API request associated with the API server of the first network domain. Additionally, or alternatively, the method 1200 includes determining that the second API request includes a request for network performance data associated with at least one of network connector nodes of the first network domain or network routes for transmitting communications through the network connector nodes of the first network domain. Additionally, or alternatively, the method 1200 includes determining the network performance data associated with the tenant. Additionally, or alternatively, the method 1200 includes sending, to the admin device. In some examples, the network performance data may include at least one of a first indication of the network performance associated with the network connector nodes, a second indication of the network performance associated with the network routes, and/or a third indication of network performance associated with the change in the network configurations for the first network domain caused at least partly by the performance of the operation. In some examples, the first indication of network performance may indicate at least one of reachability of the network connector nodes, bandwidth usage of the network connector nodes, central processing unit (CPU) usage of the network connector nodes, and a number of links available to the network connector nodes. In some examples, the second indication of the network performance may indicate at least one of the network routes associated with the first network domain and a preference associated with the network routes.

Figure 13:
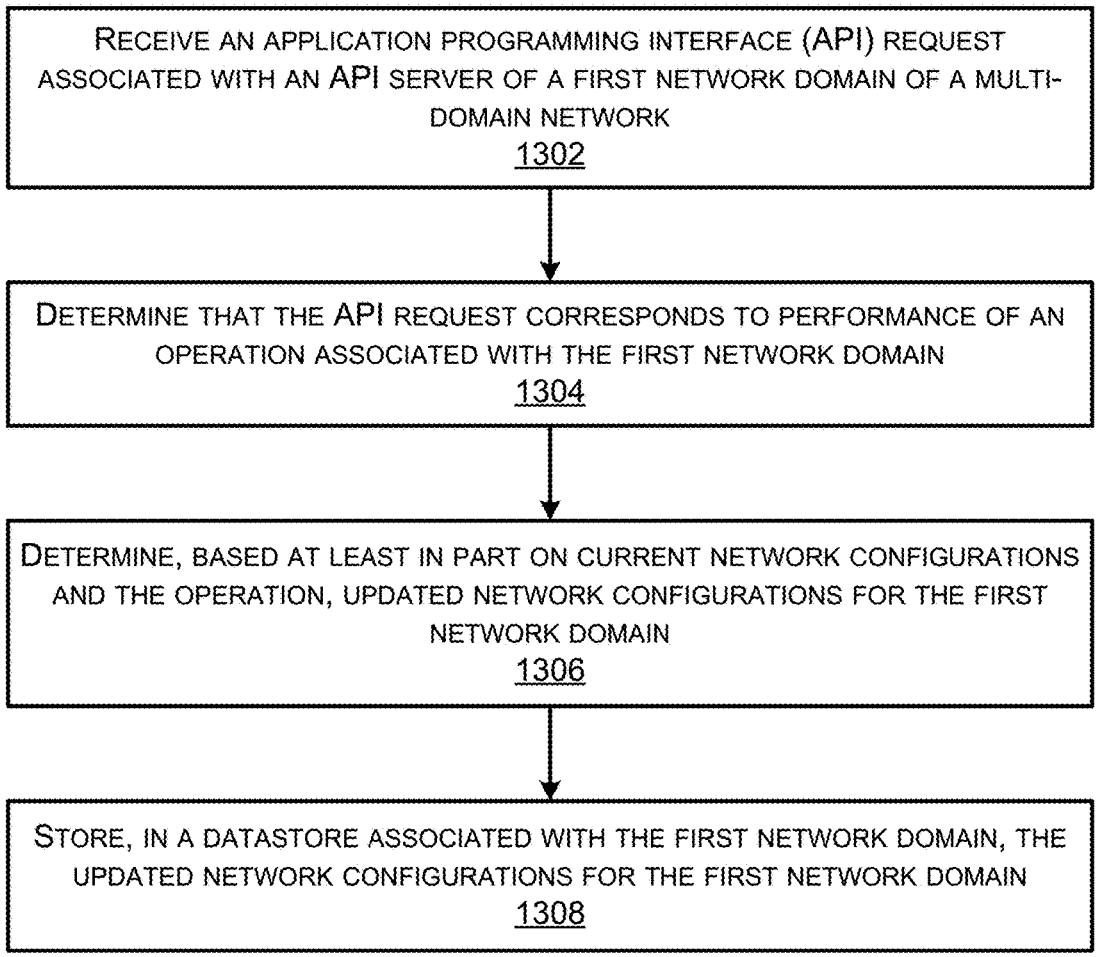
FIG. 13 illustrates a flow diagram of another example method for determining and storing updated network configuration data for a network domain of a multi-domain network based on current network configuration data of the network domain and an API request, configured to cause a routing device of the network domain to perform an operation, received at an API server.

FIG. 13 illustrates a flow diagram of another example method 1300 for determining and storing updated network configuration data for a network domain of a multi-domain network based on current network configuration data of the network domain and an API request, configured to cause a routing device of the network domain to perform an operation, received at an API server. In some examples, the multi-domain network may be configured as the multi-domain computing resource network 102 as described with respect to FIG. 1. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the API server may correspond to the API server 206 as described with respect to FIG. 2.

At 1302, the method 1300 includes receiving an API request associated with an API server of a first network domain of a multi-domain network. In some examples, the API request may correspond to the API request as described with respect to FIG. 2.

At 1304, the method 1300 includes determining that the API request corresponds to performance of an operation associated with the first network domain.

At 1306, the method 1300 includes determining, based at least in part on current network configurations and the operation, updated network configurations for the first network domain.

At 1308, the method 1300 includes storing, in a datastore associated with the first network domain, the updated network configurations for the first network domain.

Additionally, or alternatively, the method 1300 includes sending, from a first router associated with the first network domain and to an edge device in a second network domain of the multi-domain network, a border gateway protocol (BGP) advertisement indicating the updated network configurations for the first network domain.

In some examples, the operation comprises at least one of creating, reading, updating, and deleting a virtual routing and forwarding (VRF) associated with the first network domain. Additionally, or alternatively, the method 1300 includes sending, to a tenant of one or more tenants associated with the first network domain, a global identifier associated with the VRF, wherein API request is received from the tenant.

In some examples, the operation comprises at least one of creating, reading, updating, and deleting a network connector node. In some examples, the network connector node may connect the first network domain to at least one of a second network domain of the multi-domain network via a network tunnel and/or a third network domain separate from the multi-domain network. Additionally, or alternatively, the method 1300 includes sending, to a tenant of one or more tenants associated with the first network domain, a global identifier associated with the network connector node, wherein API request is received from the tenant.

In some examples, the operation comprises at least one of creating, reading, updating, and deleting a network route for transmitting communications through one or more network connector nodes of the first network domain and out of the first network domain to one or more second network domains of the multi-domain network. Additionally, or alternatively, the method 1300 includes configuring, by a first router of the first network domain, the one or more network connector nodes to transmit communications through the first network domain and out of the first network domain to one or more additional network domains according to the network route.

In some examples, the API request is received from a network connector node associated with the first network domain. Additionally, or alternatively, the method 1300 includes sending, from a first router associated with the first network domain and to the network connector node, the updated network configurations for the first network domain.

Figure 14:
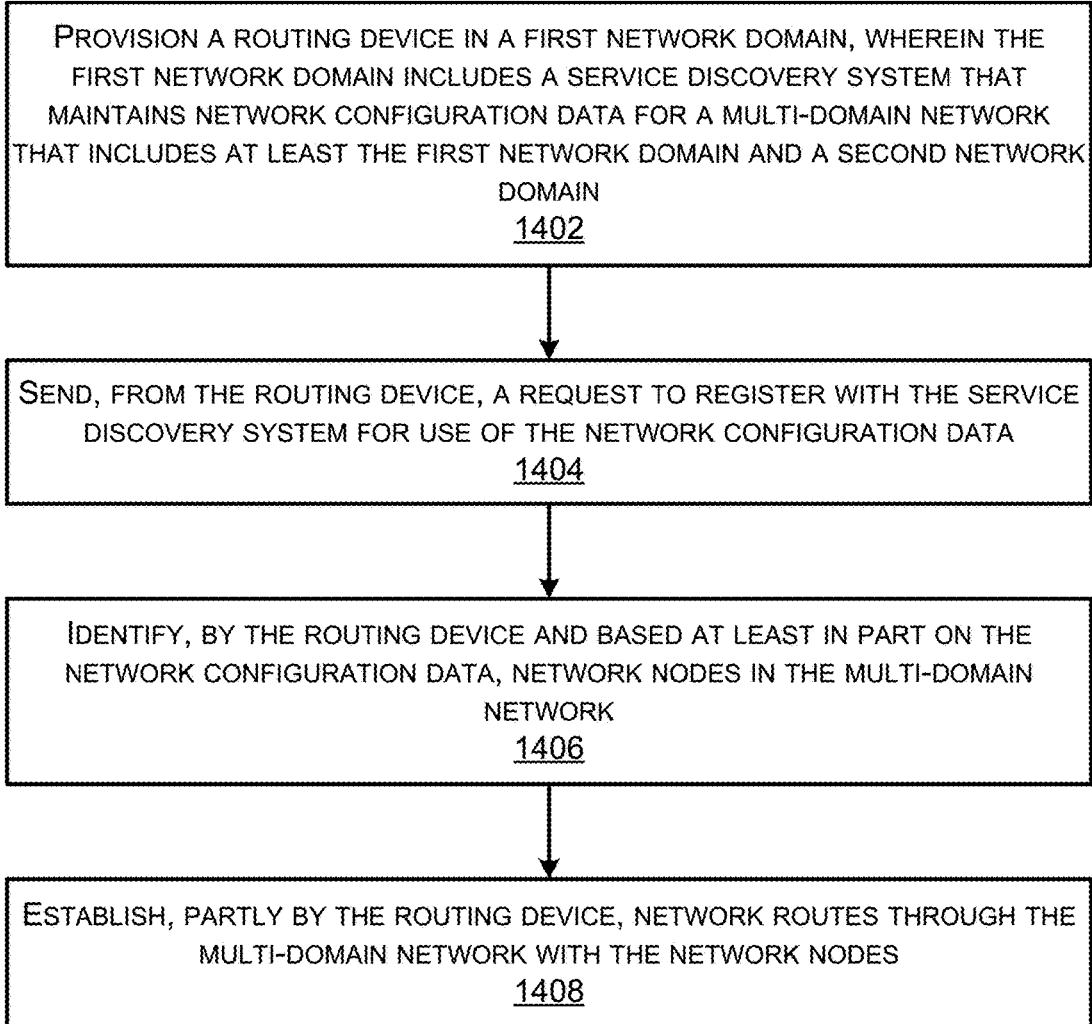
FIG. 14 illustrates a flow diagram of an example method for a routing device to register with a service discovery system to utilize network configuration data associated with a multi-domain network and identify network nodes to establish network routes through the multi-domain network using the network nodes.

FIG. 14 illustrates a flow diagram of an example method 1400 for a routing device to register with a service discovery system to utilize network configuration data associated with a multi-domain network and identify network nodes to establish network routes through the multi-domain network using the network nodes. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the service discovery system may be configured as the service discovery system and/or the datastore cluster 208 as described with respect to FIG. 2. In some examples, the network configuration data may correspond to the network configuration data 210 as described with respect to FIG. 2.

At 1402, the method 1400 includes provisioning a routing device in a first network domain, wherein the first network domain includes a service discovery system that maintains network configuration data for a multi-domain network that includes at least the first network domain and a second network domain. In some examples, the multi-domain network may be configured as the multi-domain computing resource network 102 as described with respect to FIG. 1.

At 1404, the method 1400 includes sending, from the routing device, a request to register with the service discovery system for use of the network configuration data.

At 1406, the method 1400 includes identifying, by the routing device and based at least in part on the network configuration data, network nodes in the multi-domain network.

At 1408, the method 1400 includes establishing, partly by the routing device, network routes through the multi-domain network with the network nodes.

Additionally, or alternatively, the method 1400 includes sending, from the routing device, a request for a health check associated with the first network domain. Additionally, or alternatively, the method 1400 includes receiving, at the routing device and from the service discovery system, an indication that a network route of the network routes is unreachable. Additionally, or alternatively, the method 1400 includes removing, partly by the routing device, the network route from the network routes.

Additionally, or alternatively, the method 1400 includes sending, from the routing device, a request for a health check associated with the first network domain. Additionally, or alternatively, the method 1400 includes receiving, at the routing device and from the service discovery system, an indication that a first network route of the network routes is performing below a threshold level of performance. Additionally, or alternatively, the method 1400 includes prioritizing, partly by the routing device, a second network route of the network routes over the first network route. In some examples, the second network route may be performing above the threshold level of performance.

In some examples, the routing device is a first routing device. Additionally, or alternatively, the method 1400 includes receiving, at the first routing device, a first indication that a second routing device in the second network domain is registered with the service discovery system. Additionally, or alternatively, the method 1400 includes establishing, partly by the first routing device and based at least in part on the network configuration data, a network tunnel connecting the first routing device to the second routing device. Additionally, or alternatively, the method 1400 includes identifying, by the first routing device and based at least in part on the network configuration data, additional network nodes associated with the second routing device in the multi-domain network. Additionally, or alternatively, the method 1400 includes establishing, partly by the first routing device, additional network routes through the multi-domain network with the additional network nodes.

Additionally, or alternatively, the method 1400 includes receiving, at the first routing device, a second indication that the second routing device deregistered with the service discovery system. Additionally, or alternatively, the method 1400 includes removing, partly by the first routing device and based at least in part on the network configuration data, the network tunnel connecting the first routing device to the second routing device.

Additionally, or alternatively, the method 1400 includes receiving, at the first routing device, a second indication that the second routing device deregistered with the service discovery system. Additionally, or alternatively, the method 1400 includes removing, partly by the first routing device and based at least in part on receiving the second indication, the additional network routes through the multi-domain network.

In some examples, the network routes may be first network routes. Additionally, or alternatively, the method 1400 includes sending, from the routing device, a request for a performance check associated with the first network domain. Additionally, or alternatively, the method 1400 includes receiving, at the routing device and from the service discovery system, network performance data associated with the first network domain, the network performance data indicating at least one of bandwidth usage of the network nodes, central processing unit (CPU) usage of the network nodes, and a number of links available to the network nodes. Additionally, or alternatively, the method 1400 includes establishing, partly by the routing device and based at least in part on the network performance data, second network routes through the multi-domain network with the network nodes, the second network routes being different from the first network routes.

Figure 15:
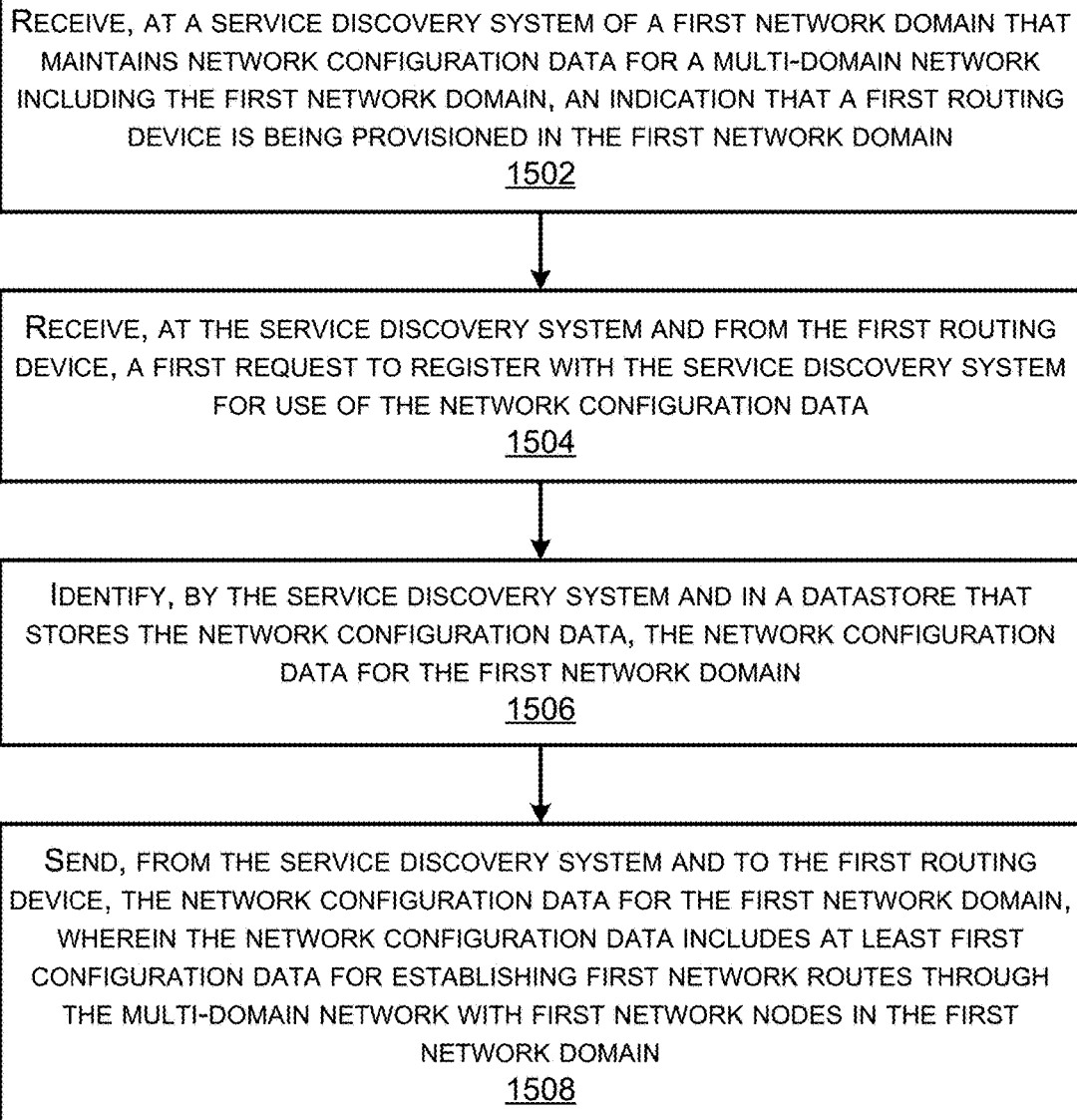
FIG. 15 illustrates a flow diagram of an example method for a service discovery system to maintain a database including network configuration data for a multi-domain network and handle requests, received from various routing devices of the multi-domain network, to register with the service discovery system and utilize the network configuration data.

FIG. 15 illustrates a flow diagram of an example method 1500 for a service discovery system to maintain a database including network configuration data for a multi-domain network and handle requests, received from various routing devices of the multi-domain network, to register with the service discovery system and utilize the network configuration data. In some examples, the routing device may be configured as the routing device 106, 302 as described with respect to FIGS. 1 and 3, respectively. Additionally, or alternatively, the routing device may be configured as a router 402 and/or a router cluster 204 as described with respect to FIGS. 4 and 2, respectively. Additionally, or alternatively, the service discovery system may be configured as the service discovery system and/or the datastore cluster 208 as described with respect to FIG. 2. In some examples, the network configuration data may correspond to the network configuration data 210 as described with respect to FIG. 2.

At 1502, the method 1500 includes receiving, at a service discovery system of a first network domain that maintains network configuration data for a multi-domain network including the first network domain, an indication that a first routing device is being provisioned in the first network domain. In some examples, the multi-domain network may be configured as the multi-domain computing resource network 102 as described with respect to FIG. 1.

At 1504, the method 1500 includes receiving, at the service discovery system and from the first routing device, a request to register with the service discovery system for use of the network configuration data.

At 1506, the method 1500 includes identifying, by the service discovery system and in a datastore that stores the network configuration data, the network configuration data for the first network domain.

At 1508, the method 1500 includes sending, from the service discovery system and to the first routing device, the network configuration data for the first network domain, wherein the network configuration data includes at least first configuration data for establishing first network routes through the multi-domain network with first network nodes in the first network domain.

Additionally, or alternatively, the method 1500 includes receiving, at the service discovery system and from the first routing device, a request for a health check. Additionally, or alternatively, the method 1500 includes determining, partly by the service discovery system, that a network route of the first network routes is unreachable. Additionally, or alternatively, the method 1500 includes sending, from the service discovery system and to the first routing device, an indication that the network route is unreachable.

Additionally, or alternatively, the method 1500 includes receiving, at the service discovery system and from the first routing device, a request for a performance check associated with the first network domain.

Additionally, or alternatively, the method 1500 includes determining, by the service discovery system, network performance data associated with the first network domain, the network performance data indicating at least one of bandwidth usage of the first network nodes, central processing unit (CPU) usage of the first network nodes, and a number of links available to the first network nodes. Additionally, or alternatively, the method 1500 includes sending, from the service discovery system and to the first routing device, the network performance data.

Additionally, or alternatively, the method 1500 includes receiving, at the service discovery system and from the first routing device, a request for a health check. Additionally, or alternatively, the method 1500 includes determining, partly by the service discovery system, that a network route of the first network routes is performing below a threshold level of performance. Additionally, or alternatively, the method 1500 includes sending, from the service discovery system and to the first routing device, an indication that the network route is performing below the threshold level of performance.

Additionally, or alternatively, the method 1500 includes receiving, at the service discovery system and from a second routing device provisioned in a second network domain of the multi-domain network, a second request to register with the service discovery system for use of the network configuration data. Additionally, or alternatively, the method 1500 includes identifying, by the service discovery system and in the datastore, the network configuration data for the first network domain and the second network domain. Additionally, or alternatively, the method 1500 includes sending, from the service discovery system and to the second routing device, the network configuration data for the first network domain and the second network domain. In some examples, the network configuration data may include at least the first configuration data and second configuration data for establishing second network routes through the multi-domain network with second network nodes in the second network domain.

Additionally, or alternatively, the method 1500 includes receiving, at the service discovery system, an indication that the second routing device deregistered with the service discovery system. Additionally, or alternatively, the method 1500 includes sending, from the service discovery system and to the first routing device, the indication that the second routing device deregistered with the service discovery system.

Figure 16:
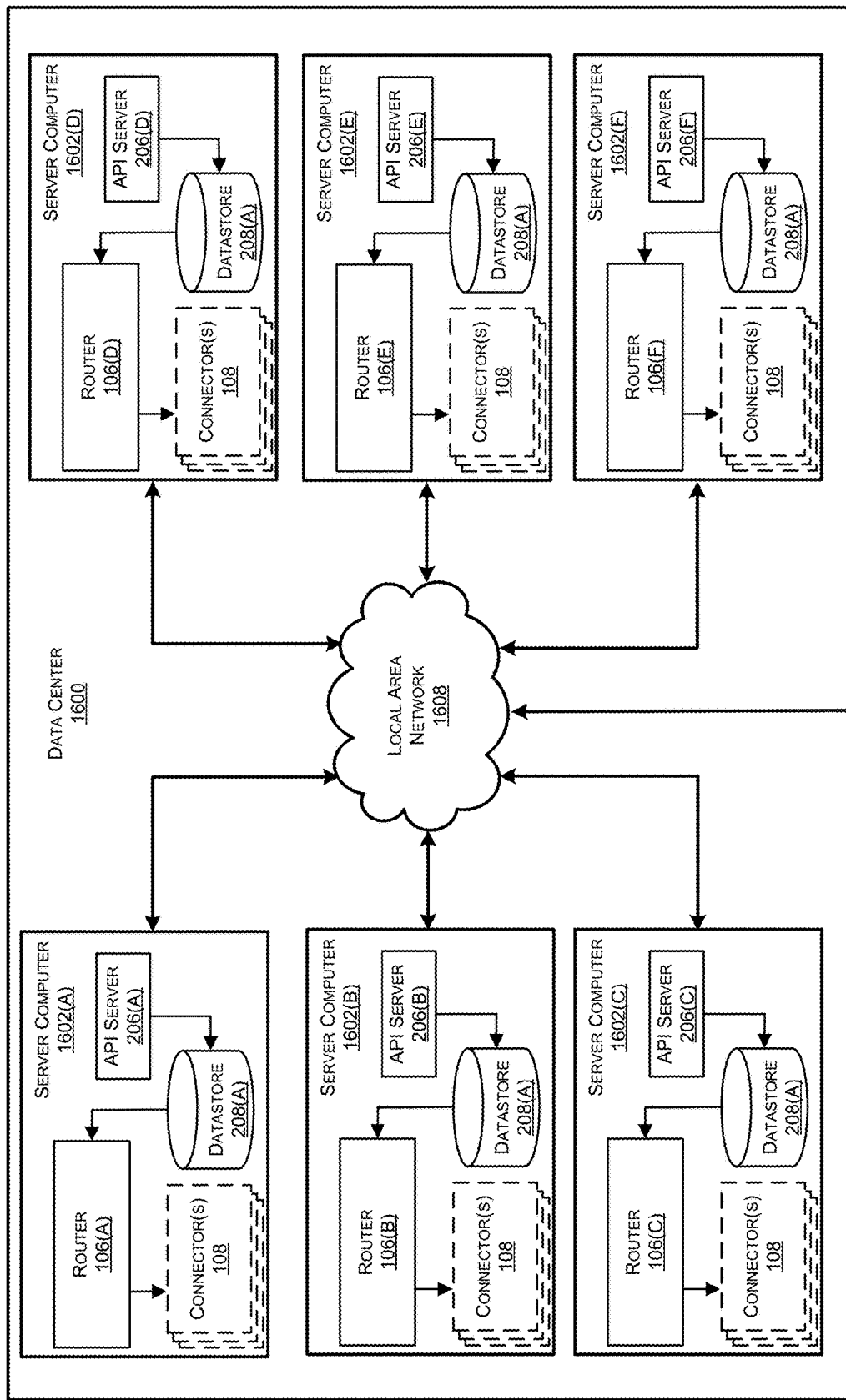
FIG. 16 illustrates a computing system diagram illustrating a configuration for a data center that can be utilized to implement aspects of the technologies disclosed herein.

FIG. 16 is a computing system diagram illustrating a configuration for a data center 1600 that can be utilized to implement aspects of the technologies disclosed herein. The example data center 1600 shown in FIG. 16 includes several server computers 1602A-1602E (which might be referred to herein singularly as "a server computer 1602" or in the plural as "the server computers 1602") for providing computing resources. In some examples, the server computers 1602 may include, or correspond to, the servers associated with the data center 104 described herein with respect to FIG. 1.

The server computers 1602 can be standard tower, rackmount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 1602 can also be configured to execute a resource manager capable of instantiating and/or managing the computing resources. In the case of VM instances, for example, the resource manager can be a hypervisor or another type of program configured to enable the execution of multiple VM instances on a single server computer 1602. Server computers 1602 in the data center 1600 can also be configured to provide network services and other types of services.

In the example data center 1600 shown in FIG. 16, an appropriate LAN 1608 is also utilized to interconnect the server computers 1602A-1602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1600, between each of the server computers 1602A-1602E in each data center 1600, and, potentially, between computing resources in each of the server computers 1602. It should be appreciated that the configuration of the data center 1600 described with reference to FIG. 16 is merely illustrative and that other implementations can be utilized.

In some examples, the server computers 1602 may each execute one or more router(s) 106, one or more datastore(s) 208, an API server 206, and/or one or more connectors 108.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 1600 (which might be referred to herein singularly as "a data center 1600" or in the plural as "the data centers 1600"). The data centers 1600 are facilities utilized to house and operate computer systems and associated components. The data centers 1600 typically include redundant and backup power, communications, cooling, and security systems. The data centers 1600 can also be located in geographically disparate locations. One illustrative embodiment for a data center 1600 that can be utilized to implement the technologies disclosed herein will be described below with regard to FIG. 17.

Figure 17:
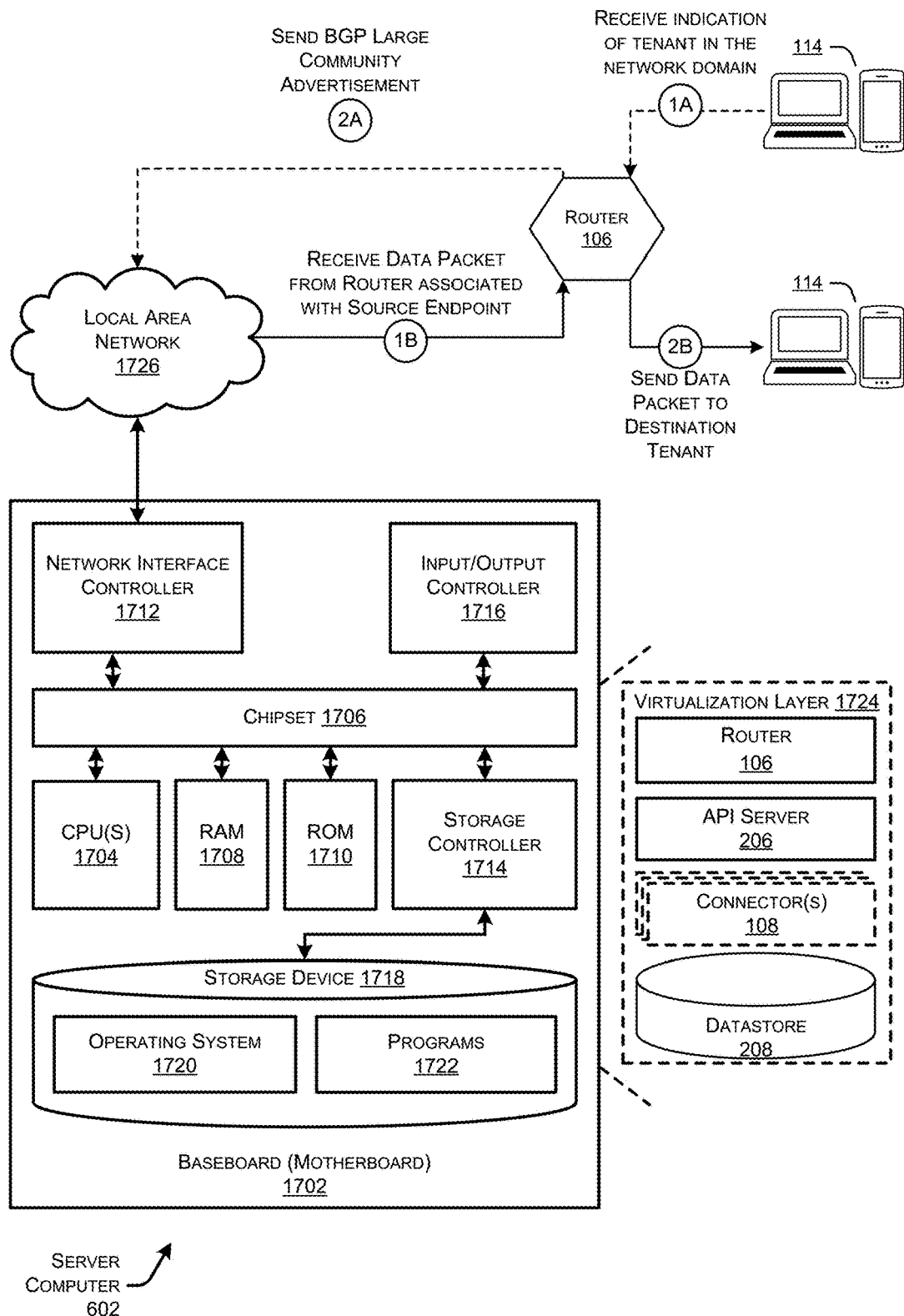
FIG. 17 is a computer architecture diagram showing an illustrative computer hardware architecture for implementing a server device that can be utilized to implement aspects of the various technologies presented herein.

FIG. 17 shows an example computer architecture for a computing device (or network routing device) 1602 capable of executing program components for implementing the functionality described above. The computer architecture shown in FIG. 17 illustrates a conventional server computer, workstation, desktop computer, laptop, tablet, network appliance, e-reader, smartphone, or other computing device, and can be utilized to execute any of the software components presented herein. The computing device 1602 may, in some examples, correspond to a physical server of a data center 104 described herein with respect to FIG. 1.

The computing device 1602 includes a baseboard 1702, or "motherboard," which is a printed circuit board to which a multitude of components or devices can be connected by way of a system bus or other electrical communication paths. In one illustrative configuration, one or more central processing units ("CPUs") 1704 operate in conjunction with a chipset 1706. The CPUs 1704 can be standard programmable processors that perform arithmetic and logical operations necessary for the operation of the computing device 1602.

The CPUs 1704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1706 provides an interface between the CPUs 1704 and the remainder of the components and devices on the baseboard 1702. The chipset 1706 can provide an interface to a RAM 1708, used as the main memory in the computing device 1602. The chipset 1706 can further provide an interface to a computer-readable storage medium such as a read-only memory ("ROM") 1710 or non-volatile RAM ("NVRAM") for storing basic routines that help to startup the computing device 1602 and to transfer information between the various components and devices. The ROM 1710 or NVRAM can also store other software components necessary for the operation of the computing device 1602 in accordance with the configurations described herein.

The computing device 1602 can operate in a networked environment using logical connections to remote computing devices and computer systems through a network, such as the network 1726. The chipset 1706 can include functionality for providing network connectivity through a NIC

1712, such as a gigabit Ethernet adapter. The NIC 1712 is capable of connecting the computing device 1602 to other computing devices over the network 1726. It should be appreciated that multiple NICs 1712 can be present in the computing device 1602, connecting the computer to other types of networks and remote computer systems.

The computing device 1602 can be connected to a storage device 1718 that provides non-volatile storage for the computing device 1602. The storage device 1718 can store an operating system 1720, programs 1722, and data, which have been described in greater detail herein. The storage device 1718 can be connected to the computing device 1602 through a storage controller 1714 connected to the chipset 1706. The storage device 1718 can consist of one or more physical storage units. The storage controller 1714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1602 can store data on the storage device 1718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1718 is characterized as primary or secondary storage, and the like.

For example, the computing device 1602 can store information to the storage device 1718 by issuing instructions through the storage controller 1714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1602 can further read information from the storage device 1718 by detecting the physical states or characteristics of one or more particular locations within the physical storage units.

In addition to the mass storage device 1718 described above, the computing device 1602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1602. In some examples, the operations performed by the computing resource network 102, and or any components included therein, may be supported by one or more devices similar to computing device 1602. Stated otherwise, some or all of the operations performed by the computing resource network 102, and or any components included therein, may be performed by one or more computing device 1602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1718 can store an operating system 1720 utilized to control the operation of the computing device 1602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1718 can store other system or application programs and data utilized by the computing device 1602.

In one embodiment, the storage device 1718 or other computer-readable storage media is encoded with computer-executable instructions which, when loaded into the computing device 1602, transform the computer from a general-purpose computing system into a special-purpose computer capable of implementing the embodiments described herein. These computer-executable instructions transform the computing device 1602 by specifying how the CPUs 1704 transition between states, as described above. According to one embodiment, the computing device 1602 has access to computer-readable storage media storing computer-executable instructions which, when executed by the computing device 1602, perform the various processes described above with regard to FIGS. 1-15. The computing device 1602 can also include computer-readable storage media having instructions stored thereupon for performing any of the other computer-implemented operations described herein.

The computing device 1602 can also include one or more input/output controllers 1716 for receiving and processing input from a number of input devices, such as a keyboard, a mouse, a touchpad, a touch screen, an electronic stylus, or other type of input device. Similarly, an input/output controller 1716 can provide output to a display, such as a computer monitor, a flat-panel display, a digital projector, a printer, or other type of output device. It will be appreciated that the computing device 1602 might not include all of the components shown in FIG. 7, can include other components that are not explicitly shown in FIG. 7, or might utilize an architecture completely different than that shown in FIG. 7.

The server computer 1602 may support a virtualization layer 1724, such as one or more components associated with the multi-domain computing resource network 102, such as, for example, the router 106, the API server 206, one or more connector(s) 108, and/or one or more datastore(s) 208. At "1A," a router 106 may receive an indication of a tenant endpoint 114 in the network domain. The router 106 may encode a BGP large community with network data for routing communications to and/or from the tenant endpoint 114. At "2A," the router may send a BGP large community advertisement to one or more additional router(s) 106. The one or more additional routers 106 may then decode the network data and store the network data in a datastore 208. Additionally, or alternatively, at "1B," the router 106 may receive a data pocket from an additional router 106 associated with a source endpoint. Additionally, or alternatively, the router 106 may determine that the data packet has a destination endpoint 114. At "2B," the router 106 may then send the data packet to the destination endpoint 114.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving a first application programming interface (API) request associated with an API server of a first network domain of a multi-domain network;
determining that the first API request corresponds to performance of an operation by a router associated with the first network domain, the router being configured to update network configurations for the first network domain;
identifying current network configurations for the first network domain in a datastore associated with the first network domain;
determining, based at least in part on the current network configurations and the operation, updated network configurations for the first network domain;
storing, in the datastore, the updated network configurations for the first network domain;
receiving, from an admin device associated with a tenant of one or more tenants associated with the first network domain, a second API request associated with the API server of the first network domain;
determining that the second API request includes a request for network performance data associated with at least the first network domain;
determining the network performance data associated with the tenant, the network performance data including at least a first indication of network performance associated with a change in the network configurations for the first network domain caused at least partly by the performance of the operation; and
sending, to the admin device, the network performance data.

2. The method of claim 1, further comprising:
identifying the change in the current network configurations for the first network domain caused at least partly by the performance of the operation, wherein determining the updated network configurations is based at least in part on the change; and
sending, from the router, a border gateway protocol (BGP) advertisement to an edge device in a second network domain of the multi-domain network, the BGP advertisement indicating the updated network configurations for the first network domain.

3. The method of claim 1, wherein the first API request is received from a network connector node associated with the first network domain, and the method further comprising:
sending, from the router and to the network connector node, the updated network configurations for the first network domain.

4. The method of claim 1, wherein tenant is a first tenant and the operation comprises at least one of creating, reading, updating, and deleting a virtual routing and forwarding (VRF) associated with the first network domain, and the method further comprising:
sending, to a second tenant of the one or more tenants associated with the first network domain, a global identifier associated with the VRF, wherein the first API request is received from the second tenant.

5. The method of claim 1, wherein the tenant is a first tenant and the operation comprises at least one of creating, reading, updating, and deleting a network connector node, the network connector node connecting the first network domain to at least one of:
a second network domain of the multi-domain network via a network tunnel; or
a third network domain separate from the multi-domain network; and
the method further comprising sending, to a second tenant of the one or more tenants associated with the first network domain, a global identifier associated with the network connector node, wherein the first API request is received from the second tenant.

6. The method of claim 1, wherein the operation comprises at least one of creating, reading, updating, and deleting a network route for transmitting communications through one or more network connector nodes of the first network domain and out of the first network domain to one or more second network domains of the multi-domain network, and the method further comprising:
configuring, by the router, the one or more network connector nodes to transmit communications through the first network domain and out of the first network domain to one or more additional network domains according to the network route.

7. The method of claim 1, wherein:
the indication is a first indication;
the second API request includes a request for network performance data associated with at least one of network connector nodes of the first network domain or network routes for transmitting communications through the network connector nodes of the first network domain; and
the network performance data including further includes at least one of:
a second indication of the network performance associated with the network connector nodes, the second indication of network performance indicating at least one of reachability of the network connector nodes, bandwidth usage of the network connector nodes, central processing unit (CPU) usage of the network connector nodes, and a number of links available to the network connector nodes; and
a third indication of the network performance associated with the network routes, the third indication of the network performance indicating at least one of the network routes associated with the first network domain and a preference associated with the network routes.

8. A system comprising:
a first network domain of a multi-domain network including at least:
a first router that updates network configurations for the first network domain;

an application programming interface (API) server; and
a datastore that stores current network configurations for the first network domain;
one or more processors; and
one or more computer-readable media storing computer-executable instructions that, when executed by the one or more processors, cause the one or more processors to perform operations comprising:
receiving, at the API server, a first API request;
determining, at the API server, that the first API request corresponds to performance of an operation with respect to at least the first network domain;
determining, at the API server and based at least in part on the current network configurations and the operation, updated network configurations for the first network domain;
storing, by the API server and in the datastore, the updated network configurations for the first network domain
receiving, at the API server, a second API request
determining, at the API server, that the second API request includes a request for network performance data associated with at least the first network domain;
receiving, at the API server and from at least the first router, the network performance data; and
sending, from the API server and to an admin device associated with a tenant of one or more tenants associated with the first network domain, the network performance data, the network performance data including at least an indication of network performance associated with a change in the network configurations for the first network domain cause at least partly by the operation.

9. The system of claim 8, wherein the first API request is received from a network connector node associated with the first network domain.

10. The system of claim 8, wherein the tenant is a first tenant and the operation comprises at least one of creating, reading, updating, and deleting a virtual routing and forwarding (VRF) associated with the first network domain, and the operations further comprising:
sending, from the API server and to a second tenant of the one or more tenants associated with the first network domain, a global identifier associated with the VRF, wherein the first API request is received from the second tenant.

11. The system of claim 8, wherein the tenant is a first tenant and the operation comprises at least one of creating, reading, updating, and deleting a network connector node, the network connector node connecting the first network domain to at least one of:
a second network domain of the multi-domain network via a network tunnel; or
a third network domain separate from the multi-domain network; and
the operations further comprising sending, from the API server and to a second tenant of the one or more tenants associated with the first network domain, a global identifier associated with the network connector node, wherein the first API request is received from the second tenant.

12. The system of claim 8, wherein the operation comprises at least one of creating, reading, updating, and deleting a network route for transmitting communications through one or more network connector nodes associated with the first router and out of the first network domain to one or more second network domains of the multi-domain network.

13. The system of claim 8, wherein:
the indication is a first indication;
the second API request includes a request for network performance data associated with at least one of network connector nodes of the first network domain or network routes for transmitting communications through the network connector nodes of the first network domain; and
the network performance data including further includes at least one of:
a second indication of the network performance associated with the network connector nodes, the second indication of the network performance indicating at least one of reachability of the network connector nodes, bandwidth usage of the network connector nodes, central processing unit (CPU) usage of the network connector nodes, and a number of links available to the network connector nodes; and
a third indication of the network performance associated with the network routes, the third indication of the network performance indicating at least one of the network routes associated with the first network domain and a preference associated with the network routes.

14. The system of claim 8, the operations further comprising:
identifying, by the API server and at least partly using the data store, the change in the network configurations for the first network domain caused at least partly by the performance of the operation; and
wherein determining the updated network configurations is based at least in part on the change in the network configurations caused at least partly by the performance of the operation.

15. A method comprising:
receiving a first application programming interface (API) request associated with an API server of a first network domain of a multi-domain network;
determining that the API request corresponds to performance of an operation associated with the first network domain;
determining, based at least in part on current network configurations and the operation, updated network configurations for the first network domain;
storing, in a datastore associated with the first network domain, the updated network configurations for the first network domain; receiving a second API request associated with the API server of the first network domain;
determining that the second API request includes a request for network performance data associated with at least the first network domain;
receiving from at least a first router associated with the first network domain, the network performance data; and
sending, to an admin device associated with a tenant of one or more tenants associated with the first network domain, the network performance data, the network performance data including at least an indication of network performance associated with a change in the network configurations for the first network domain caused at least partly by the operation.

16. The method of claim 15, further comprising sending, from the first router associated with the first network domain and to an edge device in a second network domain of the multi-domain network, a border gateway protocol (BGP) advertisement indicating the updated network configurations for the first network domain.

17. The method of claim 15, wherein the tenant is a first tenant and the operation comprises at least one of creating, reading, updating, and deleting a virtual routing and forwarding (VRF) associated with the first network domain, and the method further comprising:
 sending, to a second tenant of the one or more tenants associated with the first network domain, a global identifier associated with the VRF, wherein the first API request is received from the second tenant.

18. The method of claim 15, wherein the tenant is a first tenant and the operation comprises at least one of creating, reading, updating, and deleting a network connector node, the network connector node connecting the first network domain to at least one of:
 a second network domain of the multi-domain network via a network tunnel; or
 a third network domain separate from the multi-domain network; and
 the method further comprising sending, to a second tenant of the one or more tenants associated with the first network domain, a global identifier associated with the network connector node, wherein the first API request is received from the second tenant.

19. The method of claim 15, wherein the operation comprises at least one of creating, reading, updating, and deleting a network route for transmitting communications through one or more network connector nodes of the first network domain and out of the first network domain to one or more second network domains of the multi-domain network, and the method further comprising:
 configuring, by a first router of the first network domain, the one or more network connector nodes to transmit communications through the first network domain and out of the first network domain to one or more additional network domains according to the network route.

20. The method of claim 15, wherein the first API request is received from a network connector node associated with the first network domain, and the method further comprising:
 sending, from the first router associated with the first network domain and to the network connector node, the updated network configurations for the first network domain.

* * * * *